US012791192B2

(12) United States Patent
Hanks et al.

(10) Patent No.: US 12,791,192 B2
(45) Date of Patent: Nov. 10, 2026

(54) PORTABLE OUTDOOR COOKING DEVICE, SYSTEM AND METHOD THEREOF

(71) Applicant: North Atlantic Imports, LLC, Logan, UT (US)

(72) Inventors: Christopher L. Hanks, Nibley, UT (US); Gary E. Graham, Hyde Park, UT (US); Jared M. Smith, Paradise, UT (US); Christian S. Elkins, Hyrum, UT (US); Dillon S. McGrew, North Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 363 days.

(21) Appl. No.: 18/401,494

(22) Filed: Dec. 31, 2023

(65) Prior Publication Data

US 2024/0219032 A1 Jul. 4, 2024

Related U.S. Application Data

(60) Provisional application No. 63/544,278, filed on Oct. 16, 2023, provisional application No. 63/436,548, filed on Dec. 31, 2022.

(51) Int. Cl.

| | |
|---|---|
| ***F24C 3/00*** | (2006.01) |
| ***A47J 37/06*** | (2006.01) |
| ***A47J 37/07*** | (2006.01) |

(52) U.S. Cl.

CPC ........... *F24C 3/002* (2013.01); *A47J 37/0682* (2013.01); *A47J 37/0763* (2013.01); *A47J 2037/0777* (2013.01)

(58) Field of Classification Search

CPC .. A47J 37/0682; A47J 37/0676; A47J 37/067; A47J 37/0763; F24C 3/002
USPC ........................................................ 126/25 R
See application file for complete search history.

(56) References Cited

U.S. PATENT DOCUMENTS

| | | | | |
|---|---|---|---|---|
| 4,987,827 | A | 1/1991 | Marquez | |
| 10,327,588 | B2 | 6/2019 | Dahle et al. | |
| 10,327,589 | B1 | 6/2019 | Dahle et al. | |
| 11,116,360 | B2 | 9/2021 | Dahle et al. | |
| D934,611 | S | 11/2021 | Dahle et al. | |
| 2021/0244233 | A1 | 8/2021 | Bush, III et al. | |
| 2021/0315416 | A1 * | 10/2021 | Fullmer | A47J 37/067 |

(Continued)

FOREIGN PATENT DOCUMENTS

| | | | | |
|---|---|---|---|---|
| GB | 2083741 A | * | 3/1982 | A47J 37/0676 |

*Primary Examiner* — Vivek K Shirsat
(74) *Attorney, Agent, or Firm* — Foley & Lardner LLP

(57) ABSTRACT

A portable cooking stove configured to be compactable is provided. In one embodiment, the cooking stove includes a main body, a lid, a griddle, and an elongated structure. The lid is hingeably coupled to the main body. The main body includes burners positioned therein. The griddle is removably secured to the main body with the elongated structure. The elongated structure includes a handle at one end thereof to be positioned through one or more panels of the main body with the handle exposed along an exterior side of the main body and with the elongated structure configured to engage a griddle opening defined in an underside of the griddle. The griddle is further removably secured to the main body with at least one tab of the griddle configured to engage structure associated with the one or more panels of the main body.

15 Claims, 21 Drawing Sheets

(56) References Cited

U.S. PATENT DOCUMENTS

| | | | |
|---|---|---|---|
| 2022/0338673 | A1 | 10/2022 | Graham et al. |
| 2023/0414038 | A1 | 12/2023 | Bush, III et al. |

* cited by examiner

PORTABLE OUTDOOR COOKING DEVICE, SYSTEM AND METHOD THEREOF

CROSS-REFERENCE TO RELATED APPLICATIONS

This application claims the benefit of U.S. Provisional Application No. 63/436,548, filed Dec. 31, 2022, as well as U.S. Provisional Application No. 63/544,278, filed Oct. 16, 2023, the disclosures of which are hereby incorporated by reference herein in their entirety.

TECHNICAL FIELD

The present invention relates generally to portable outdoor cooking devices and, more specifically, the present invention relates to compactable, portable outdoor cooking devices.

BACKGROUND

Outdoor cooking has become a popular tradition in much of the world. As outdoor cooking has increased in popularity, the ability to cook in areas other than the backyard, such as parks, camp sites, and tailgating, is becoming more in demand. As such, it would be advantageous to provide a portable cooking device that facilitates the ability to readily store the cooking device, travel with the cooking device, as well as the ability to utilize the portable cooking device at most any location desired while still maintaining features in the portable cooking device to assist in managing food byproduct to, thereby, assist in keeping the cooking device in a clean and maintained state.

BRIEF SUMMARY OF THE INVENTION

The present invention is directed to various embodiments of a portable cooking stove configured to be compactable. In one embodiment, the portable cooking stove includes a main body, a griddle, and an elongated structure. The main body extends with one or more panels and a lid hingeably coupled to the main body, the main body includes burners positioned therein. The griddle is sized and configured to be positioned over the burners and supported by the main body, the griddle including at least one tab extending from the griddle and a griddle opening defined in an underside of the griddle. The elongated structure defines an axis extending along a longitudinal length of the elongated structure, the elongated structure including a handle at one end of the elongated structure. The elongated structure is configured to be positioned through the one or more panels of the main body with the handle exposed along an exterior side of the main body and with the elongated structure configured to engage with the griddle opening defined in the underside of the griddle. With this arrangement, the griddle is configured to be removably secured to the main body with the at least one tab of the griddle sized to engage structure associated with the one or more panels of the main body and with the elongated structure removably secured to the griddle opening defined in the underside of the griddle.

In another embodiment, the handle is configured to be rotated about the axis of the elongated structure to threadably secure the elongated structure to the griddle. In another embodiment, the elongated structure includes a spring and an arm, the spring configured to bias the elongated structure toward the griddle such that, upon the handle being rotated in one direction, the arm is engageable with structure defining the griddle opening and, upon the handle being rotated in another direction, the arm is disengageable with the structure defining the griddle opening. In still another embodiment, the one or more panels of the main body includes at least one tab inlet defined therein, the tab inlet sized and configured to receive the at least one tab of the griddle for securing the griddle to the main body.

In another embodiment, the lid includes one or more latches, the lid configured to be moved between an open position and a closed position, wherein, upon the lid being in the closed position, the lid is latchable to the main body to maintain the lid in the closed position. In another embodiment, the underside of the griddle includes ribs extending therefrom, the ribs positioned to exhibit an x-configuration to reinforce the griddle from thermal stresses. In yet another embodiment, the portable cooking stove further includes a range grate, the range grate positioned along one side of the griddle and securable to the main body. In another embodiment, the portable cooking stove further includes a grease cup with at least one rail, the grease cup moveable between a use position and a stow position, the use position configured to be positioned below a rear opening defined in the griddle, and the stow position configured to be positioned within a slot defined along a rear side of the main body.

In another embodiment, the one or more panels includes a lower panel and an inner panel, the inner panel acting as a heat shield to an exterior surface of the main body. In another embodiment, the one or more panels of the main body extend to define a front side of the main body, the front side including a burner knob, a latch and a handle, the burner knob positioned between the handle and the latch, the burner knob extending from the front side to define a knob depth, the handle and the latch extending from the front side of the main body at a greater depth than the knob depth.

In accordance with another embodiment of the present invention, a portable cooking stove configured to be compactable is provided. The portable cooking stove includes a main body, a griddle, and a grease cup. The main body extends with one or more panels and a lid hingeably coupled to the main body. The main body includes burners positioned therein. Further, the main body defines a slot along a rear side of the griddle with a bracket positioned within the slot. The griddle is sized and configured to be positioned over the burners and is supported by the main body. The griddle is configured to be removably secured to the main body. Further, the griddle includes a grease drain opening defined therein. The grease cup includes an arm extending along a side of the grease cup, the grease cup configured to be movable between a use position and a stow position. With this arrangement, upon the grease cup being moved to the use position, the arm of the grease cup is latchable on the main body such that the grease cup is positionable to receive grease from the grease drain opening defined in the griddle, and upon the grease cup being moved to the stow position, the arm of the grease cup is positionable over the bracket in the slot defined in the rear side of the main body.

In another embodiment, upon the grease cup being in the stow position, an extension member is moveable over an entrance of the slot to maintain the grease cup within the slot. In another embodiment, the portable cooking stove further includes an elongated structure configured to removably secure the griddle to the main body, the elongated structure extending to define a longitudinal axis along a length thereof, the elongated structure configured to extend through the main body toward the griddle, the elongated structure configured to be secured to the griddle with rotational movement.

In another embodiment, the lid includes one or more latches, the lid configured to be moved between an open position and a closed position, wherein, upon the lid being in the closed position, the lid is latchable to the main body to maintain the lid in the closed position. In another embodiment, the underside of the griddle includes ribs extending therefrom, the ribs positioned to exhibit an x-configuration to reinforce the griddle from thermal stresses. In another embodiment, the portable cooking stove further includes a range grate, the range grate positioned along one side of the griddle and securable to the main body.

In another embodiment, the one or more panels includes a lower panel and an inner panel, the inner panel acting as a heat shield to an exterior surface of the main body. In still another embodiment, the one or more panels of the main body extend to define a front side of the main body, the front side including a burner knob, a latch and a handle, the burner knob positioned between the handle and the latch, the burner knob extending from the front side to define a knob depth, the handle and the latch extending from the front side of the main body at a greater depth than the knob depth.

In accordance with another embodiment of the present invention, a portable cooking stove configured to be compactable is provided. The portable cooking stove includes a main body, a griddle, and multiple feet. The main body extends with one or more panels and a lid hingeably coupled to the main body. The main body includes gas flame burners positioned therein. Further, the main body includes a lower panel, a rear panel, and an inner panel. The inner panel is positioned above the lower panel with an air gap therebetween, the rear panel extending between the lid and the lower panel along a rear side of the main body. The lower panel defines lower vents therein, and the inner panel defines burner vents therein. Further, the rear panel defines rear vents therein. The griddle is sized and configured to be positioned over the burners and supported by the main body. Further, the griddle is configured to be removably secured to the main body. The multiple feet are coupled to the lower panel. With this arrangement, upon the gas flame burners being ignited, heat generated by the gas flame burners is configured to exhaust through the rear vents, which draws air from the exterior though the lower vents into the air gap such that the air continues to be drawn through the burner vents to feed the gas flame burners oxygen.

In another embodiment, the inner panel acts as a heat shield to an exterior surface of the main body. In another embodiment, the air gap between the inner panel and the lower panel is configured to facilitate air flow through the lower vents and the burner vents to assist in minimizing a temperature of an exterior surface of the main body. In another embodiment, the portable cooking stove further includes an elongated structure configured to removably secure the griddle to the main body, the elongated structure extending to define a longitudinal axis along a length thereof, the elongated structure configured to extend through the main body toward the griddle, the elongated structure configured to be secured to the griddle with rotational movement.

In another embodiment, the lid includes one or more latches, the lid configured to be moved between an open position and a closed position, wherein, upon the lid being in the closed position, the lid is latchable to the main body to maintain the lid in the closed position. In another embodiment, the griddle includes ribs extending from an underside of the griddle, the ribs positioned to exhibit an x-configuration to reinforce the griddle from thermal stresses. In another embodiment, the portable cooking stove further includes a range grate, the range grate positioned along one side of the griddle and securable to the main body. In still another embodiment, the one or more panels of the main body extend to define a front side of the main body, the front side including a burner knob, a latch and a handle, the burner knob positioned between the handle and the latch, the burner knob extending from the front side to define a knob depth, the handle and the latch extending from the front side of the main body at a greater depth than the knob depth.

In accordance with another embodiment of the present invention, a method for securing a griddle to a portable cooking stove is provided. The method incudes the steps of: providing a main body with one or more panels and a lid hingeably coupled to the main body, the main body including burners positioned therein; positioning at least one tab extending from a griddle to engage structure associated with the one or more panels of the main body such that the griddle extends over the burners; positioning an elongated structure to extend through the one or more panels of the main body with a handle of the elongated structure exposed along an exterior side of the main body such that one end of the elongated structure is adjacent a griddle opening defined in an underside of the griddle; and rotating the handle of the elongated structure so that the one end of the elongated structure engages the griddle opening defined in the griddle to connect the one end of the elongated structure to the griddle.

In another embodiment, the step of rotating the handle includes threadably coupling the one end of the elongated structure to the griddle opening defined in the griddle. In another embodiment, the strep of rotating the handle includes engaging the griddle opening defined in the griddle with the one end of the elongated structure being spring biased against the griddle. In another embodiment, the method further includes the step of latching the lid to the main body to removably lock the lid thereto to place the portable cooking stove in a compact configuration. In another embodiment, the method further includes the step of moving a grease cup from a use position to a stow position such that the grease cup is maintained in a slot defined in a rear side of the main body to place the portable cooking stove in the compact configuration.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
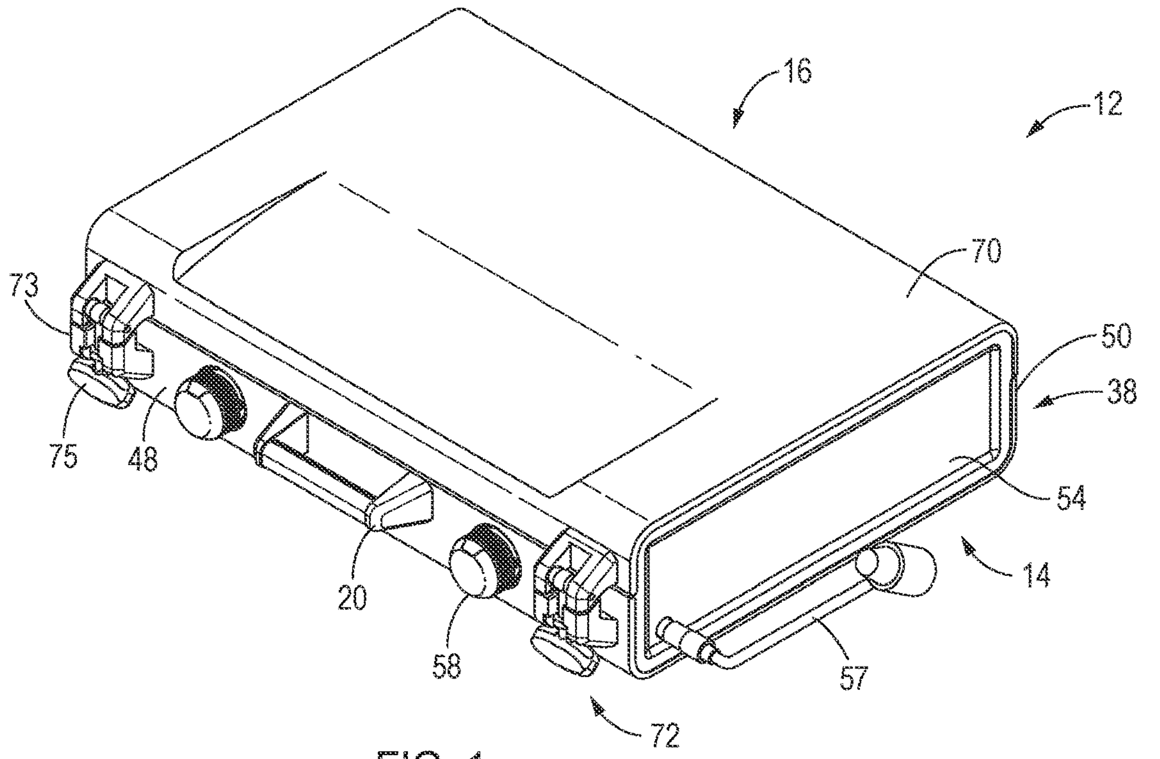
FIG. 1 is a perspective view of a portable cooking stove, depicting the cooking stove in a compact configuration, according to one embodiment of the present invention.
Figure 2:
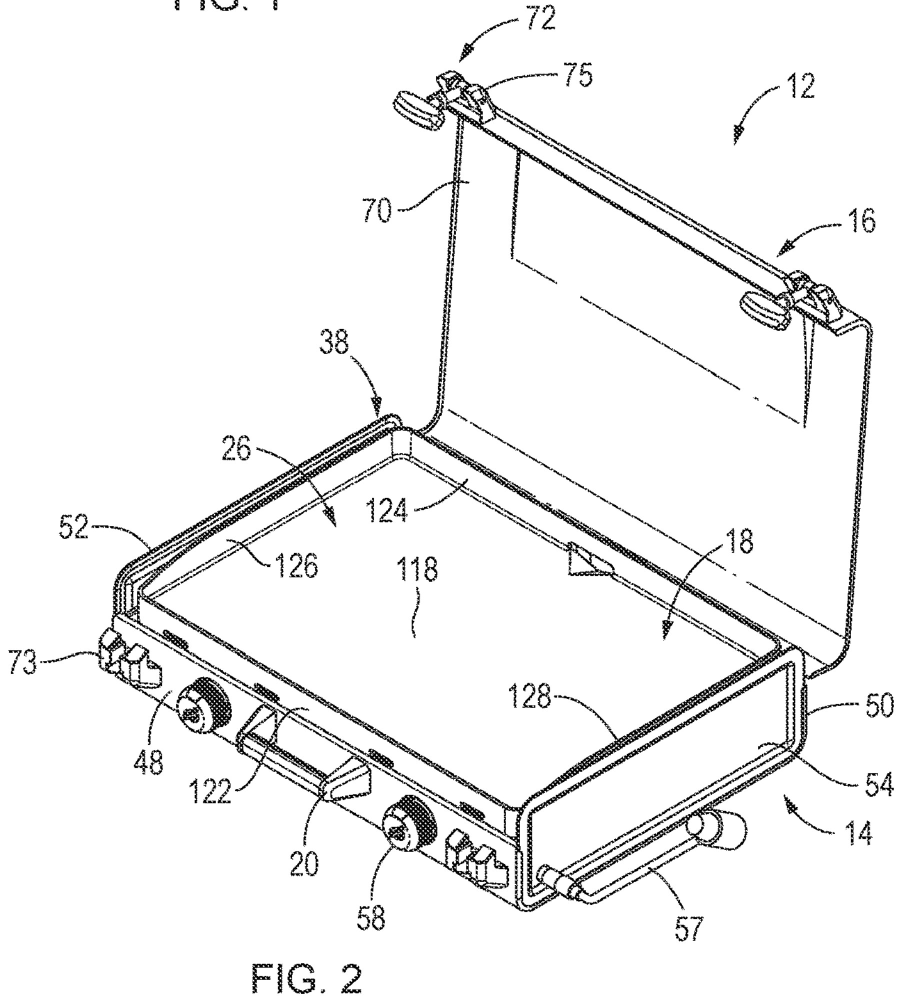
FIG. 2 is a perspective view of the portable cooking stove, depicting the cooking stove in an open, use configuration, according to another embodiment of the present invention.
Figure 3:
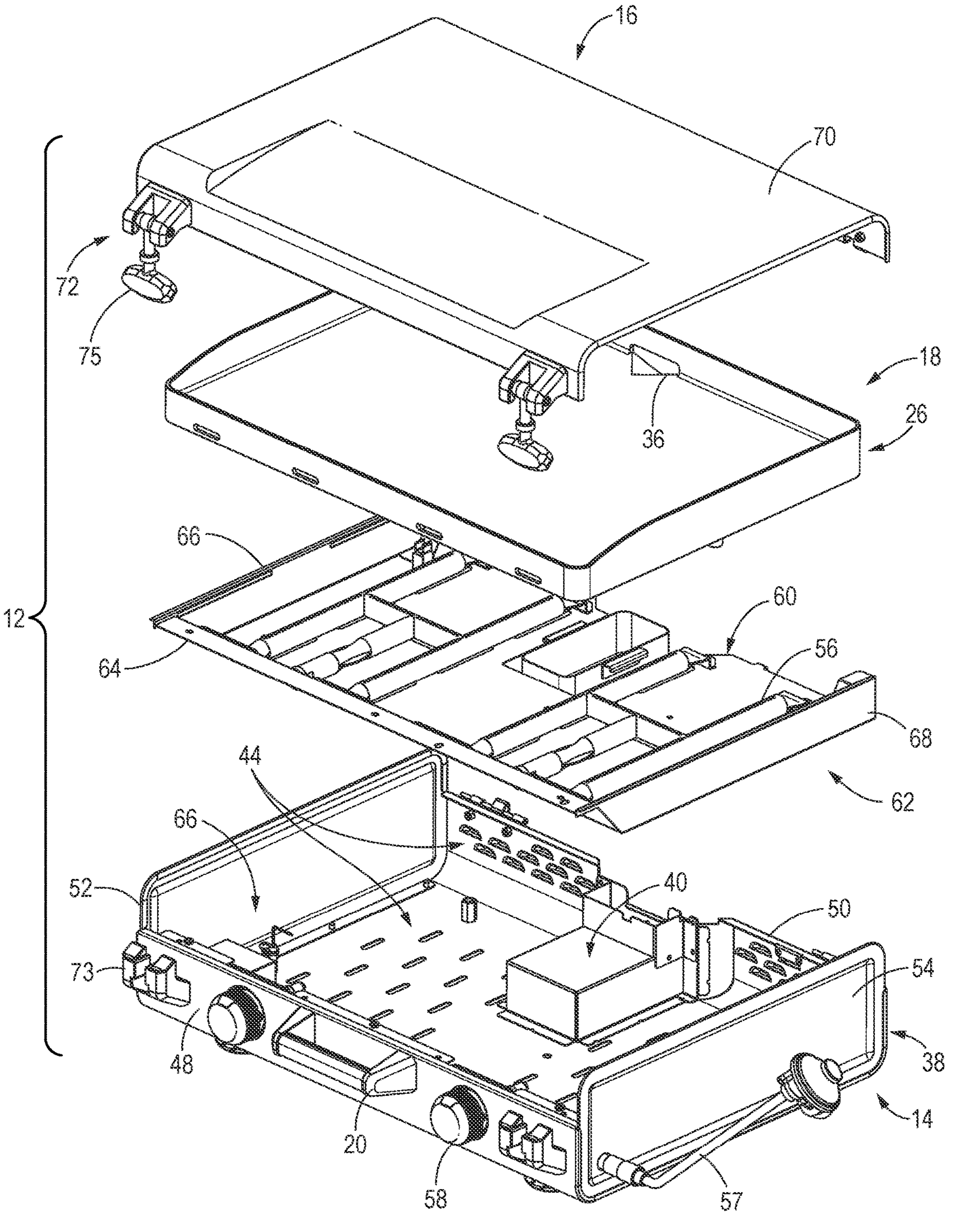
FIG. 3 is an exploded front perspective view of the portable cooking stove, according to another embodiment of the present invention.
Figure 4:
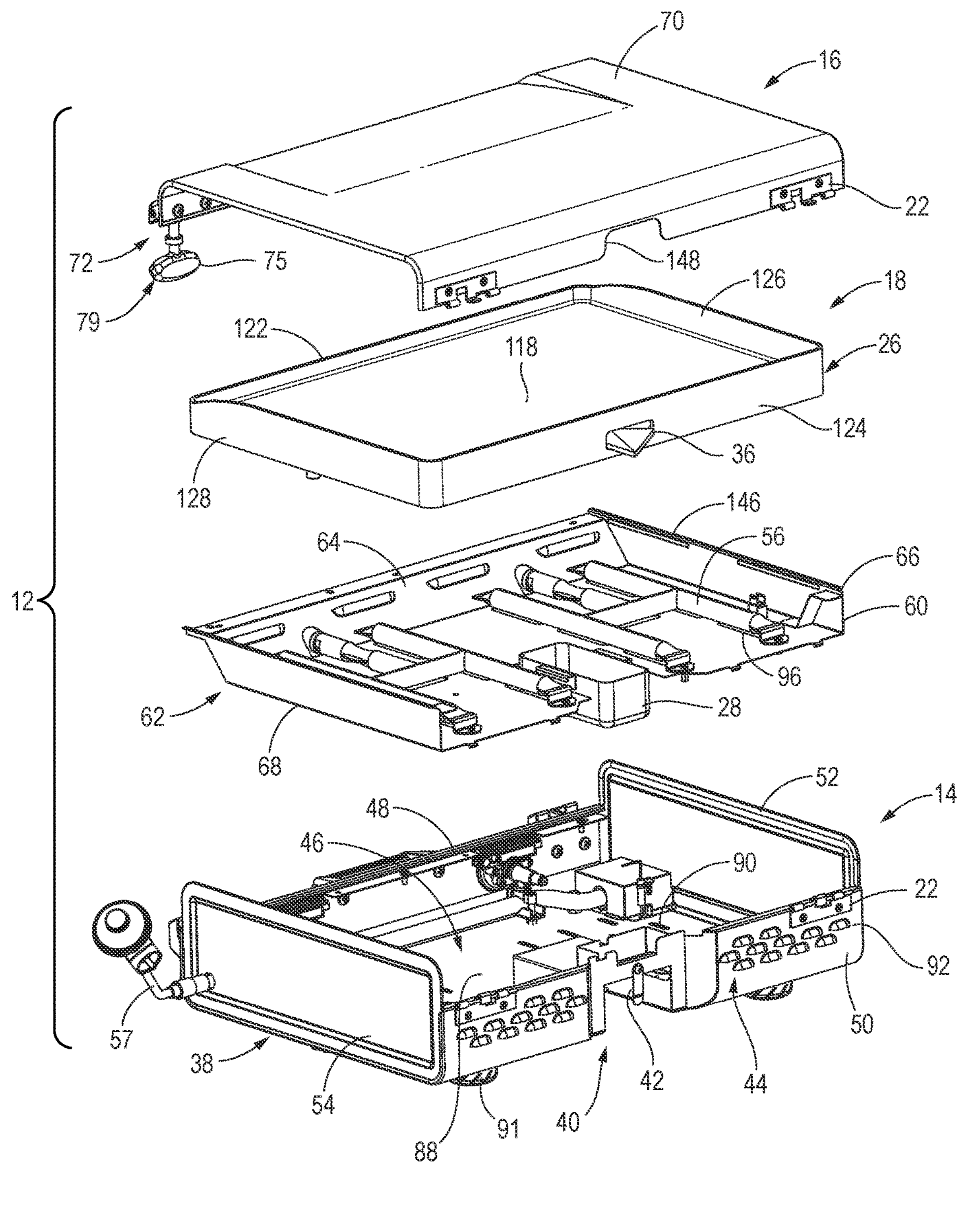
FIG. 4 is an exploded rear perspective view of the portable cooking stove, according to another embodiment of the present invention.
Figure 5:
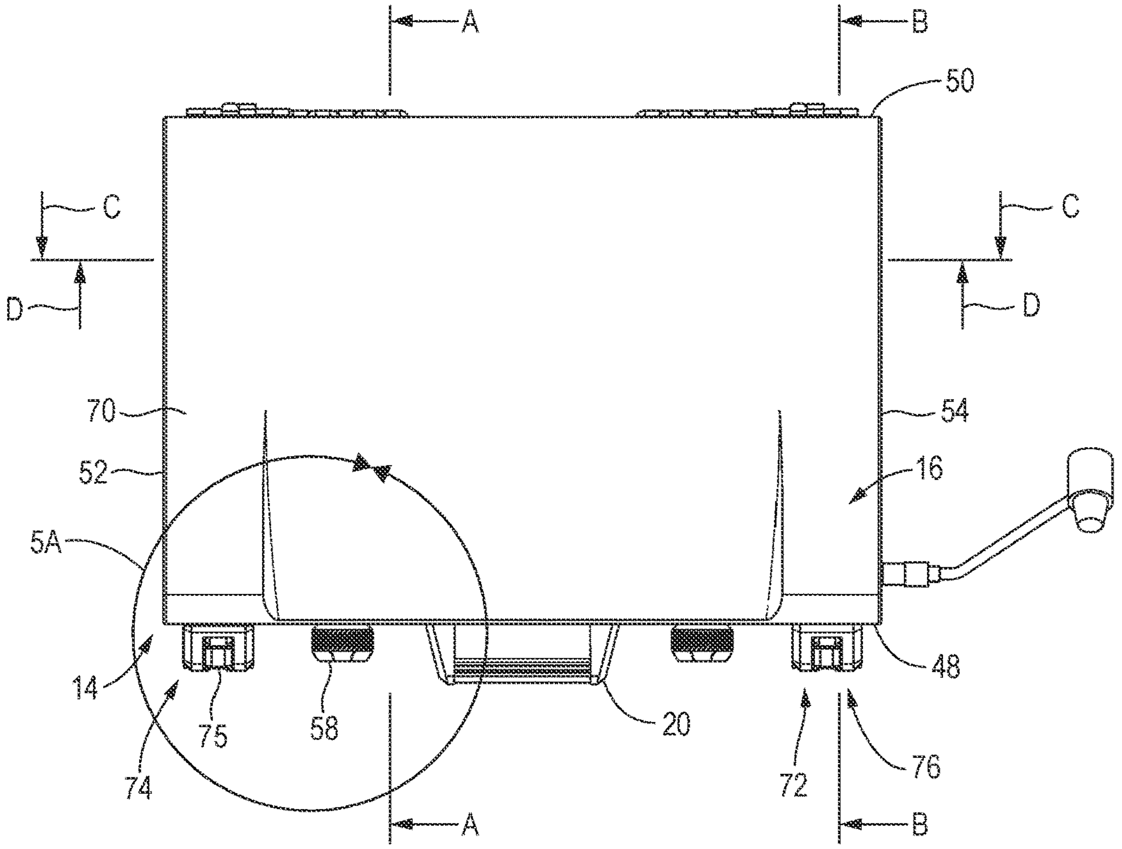
FIG. 5 is a top view of the portable cooking stove, depicting the cooking stove in the compact configuration, according to another embodiment of the present invention.
Figure 5A:
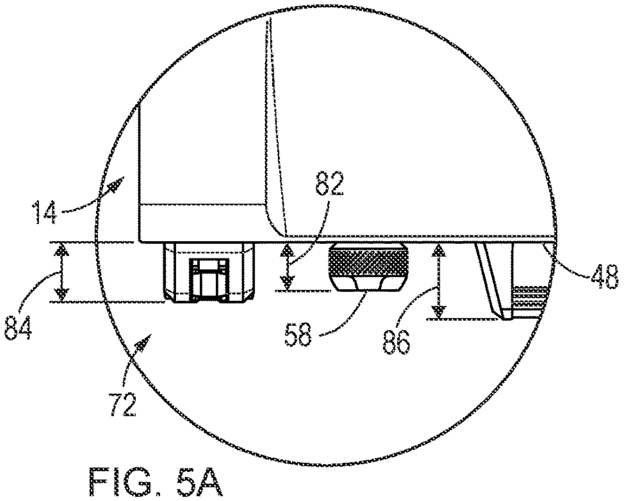
FIG. 5A is an enlarged view of the portable cooking stove taken from region 5A of FIG. 5, depicting depths of various components of the cooking stove, according to another embodiment of the present invention.
Figure 6:
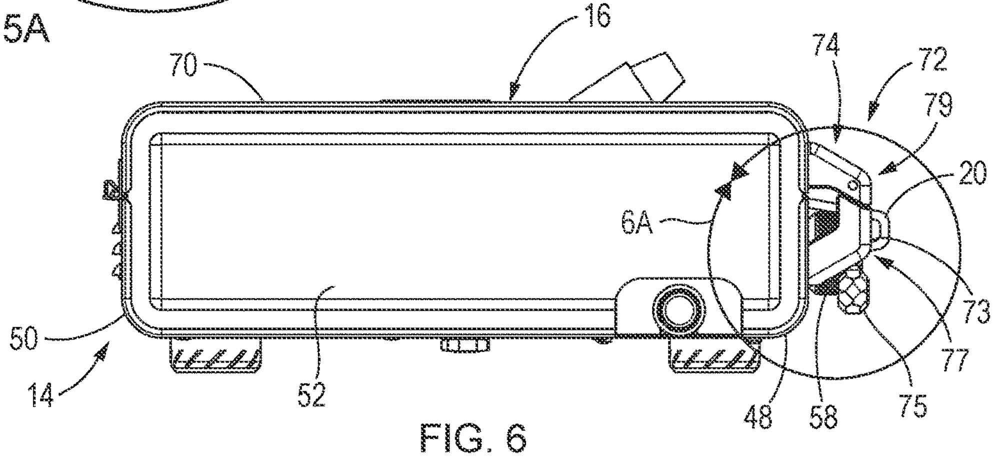
FIG. 6 is a side view of the portable cooking stove, depicting the cooking stove in the compact configuration, according to another embodiment of the present invention
Figure 6A:
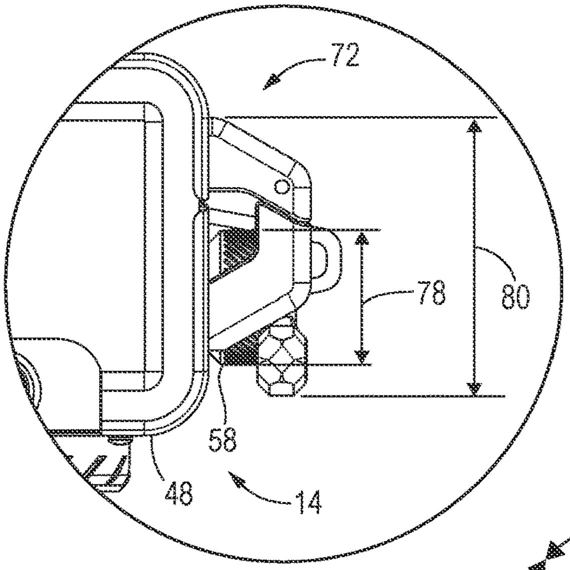
FIG. 6A is an enlarged view of the portable cooking stove taken from region 6A in FIG. 6, depicting relative sizing of various components of the cooking stove, according to another embodiment of the present invention.

Referring to FIGS. 1, 3, and 4, a portable cooking stove 12 with a main body 14 and lid 16 hingeably coupled to the main body 14 is provided. Such portable cooking stove 12 may be configured to be compactable such that the lid 16 may extend over a cooking surface 18 (such as a griddle or grill structure) and lock or latch to the main body 14, placing the cooking stove 12 in a closed or compact configuration (see FIG. 1). The cooking stove 12 may include a handle 20 so that when the cooking stove 12 is in the compact configuration, the cooking stove 12 may be carried via the handle 20 in a portable manner so as to resemble a brief case type container. Such compact configuration of the cooking stove 12 maintains the components therein in a tight, compact position to readily facilitate the portability, storage or transportation of the cooking stove 12. Further, upon it being desired to cook with the cooking stove 12, the cooking stove may readily be moved from the closed, compact configuration to a use position (see FIG. 2) by simply unlatching the lid 16 and pivotably moving the lid 16 outward, thereby, moving the cooking stove 12 to an open, use position.

In one embodiment, the lid 16 may be hingeably coupled to the main body 14 by a hinge 22 sized and configured to resist unvoluntary opening and closing of the lid 16. The hinge 22 may include an open resistance structure 24 (FIG. 7A) and closing resistance structure 25 (FIG. 7A). The open resistance structure 24 (FIG. 7A) may be sized and configured to resist the lid 16 from opening too far and the closing resistance 25 structure (FIG. 7A) may be sized and configured to resist the lid 16 from closing when in use. In another embodiment, the cooking stove 12, being in the compact configuration, may be configured to secure removable parts such as, for example, a griddle 26 and a grease cup 28, such that the removable parts may not be unintentionally removed, separated or lost when the cooking stove 12 may be transported or stored. The griddle 26 may be associated with tabs 30 (FIG. 20), a bolt 32 (FIG. 20), and a bolt inlet (FIG. 20) 34 each configured to cooperate together so as to be sized and configured to secure the griddle 26 to the main body 14. In another embodiment, the griddle 26 may include a grease drain portion 36 configured to direct grease to the grease cup 28, where the grease cup 28 may be in a use position located on an exterior 38 of the main body 14. The grease cup 28 may be stowed in a slot 40 sized and configured to receive, hold and secure the grease cup 28 therein with an adjustable lever 42 or tab associated with the main body 14, the adjustable lever 42 employed to secure the grease cup 28 to the cooking stove 12 when the cooking stove 12 is in the compact configuration. The adjustable lever 42 may be positioned over the slot 40 such that the adjustable lever 42 may be moveable to further secure the grease cup 28 to the main body 14. In another embodiment, the cooking stove 12 may also include a ventilation system 44 configured to direct air to an interior 46 of the main body 14 and further direct warmed air or exhaust out of the main body 14, discussed further herein.

With reference to FIGS. 1-4, the cooking stove 12 may include the main body 14, which may extend with one or more exterior and interior panels and various frame components. For example, the main body, in part, may extend to define a front panel 48, a rear panel 50, a left panel 52, and a right panel 54 extending to define the interior 46 of the main body 14. Each of the front, rear, left and right panels 48, 50, 52, 54 may also define an exterior surface of the main body 14. The front panel 48, rear panel 50, left panel 52, and right panel 54 may house various components and controls within the interior 46 of the main body 14 for the cooking stove 12 to appropriately function and operate. For example, the interior 46 may include heating elements, such as burners 56, where the burners 56 may extend between the front panel 48 and the rear panel 50. Such burners 56 may be gas flame burners sized and configured burn propane gas or natural gas with a regulator component 57 integrated with the cooking stove 12 and the various valves and various fuel burning components, as known to one of ordinary skill in the art, such that the regulator component 57 may be removably coupled to a propane tank, such as a typical 1.0 lb. propane tank or the like. Such regulator component 57 may be removably coupled to one of the side walls of the cooking stove 12. Further, the front panel 48 may include various components and controls secured to the front panel 48, such as a fuel line, valves, and other components, as known to one of ordinary skill in the art. Further, the front panel 48 may include burner knobs 58 positioned on the exterior 38 of the main body 14 such that each one of the burner knobs 58 may be coupled to and aligned with a corresponding one of the burners 56. The burner knobs 58 may be sized and configured to be rotated to move the burner knobs 58 to various open positions and to a closed position. As such, upon rotating one or all the burner knobs 58 to an open position, fuel may flow through the corresponding burners 56. Further, upon rotating one or all the burner knobs 58 to the closed position (or off position), the fuel may be blocked from being supplied to the burners 56. The main body 14 may also include an igniter switch or igniter function that may be sized and configured to ignite the fuel in the burners 56. The igniter function may be positioned on an exterior 38 of the main body 14, such as the front panel 48, or, in another embodiment, the igniter function may be incorporated as part of the burner knobs 58 such that, upon moving one of the burner knobs to an open position, the ignitor function may be automatically generated to ignite fuel being supplied to the burners 56. Where only some of the primary components for operating the cooking stove 12 are described herein, the remaining components, such as various valves, tubing, and various couplings and links, or the like may be incorporated herewith and into the cooking stove 12, as known by one of ordinary skill in the art.

The burners 56 may be positioned in an inner tray 60 where the inner tray 60 may be positioned in the interior 46 of the main body 14. The inner tray 60 may include multiple panels and may be interconnected to the main body 14 and may be referenced as a part of the main body of the cooking stove 12. The inner tray 60 may include sides 62 extending generally parallel to, or corresponding with, the front panel 48, left panel 52, and right panel 54 to define a front side 64, left side 66, and right side 68 of the inner tray 60. Further, the inner tray 60 may be configured to retain heat within the main body 14 so as to act as a heat shield to the main body 14 to minimize the temperature of the exterior surface of the main body 14. Further, the various gaps between the inner tray 60 and the main body 14 and the venting defined in the inner tray 60 and the main body 14 may facilitate appropriate air flow to the burners 56 as well as cooling of the main body 14. The burners 56 may be positioned within the inner tray 60 to facilitate heating the griddle 26 positioned directly above the burners 56. The griddle 26 may be sized and configured to extend partially along the front panel 48, rear panel 50, left panel 52, and right panel 54 such that the griddle 26 may be positioned at least partially within the interior 46 of the main body 14.

The cooking stove 12, in the compact configuration, may include the lid 16 extending to define an upper panel 70 where the upper panel 70 is configured to extend from the rear panel 50 to the front panel 48 of the main body 14. Further, the lid 16, or more specifically, the upper panel 70, may extend continuously from the rear panel 50 to the front panel 48 so as to extend over the cooking surface 18 of the griddle 26. The upper panel 70 of the lid 16 may be hingeably coupled to the rear panel 50 such that the lid 16 may be moveable from a closed position to an open position. The lid 16 may lock to the front panel 48 of the main body 14 by a locking system 72. The locking system 72 may be positioned partially on the front panel 48 of the main body 14 and the upper panel 70 of the lid 16. Further, the locking system 72 may define a catch 73 positioned on the front panel 48 of the main body 14 and a latch 75 positioned on the upper panel 70 of the lid 16. The catch 73 may be sized and configured to hold, grip, or lock the latch 75 in place such that the lid 16 may be locked to the main body 14 to, thereby, place the cooking stove 12 in the compact configuration. The handle 20 may be positioned on the front panel 48 of the main body 14 between the burner knobs 58 as well as between components of the locking system 72. Further, the handle 20 may be sized and configured for the cooking stove 12 to be readily carried and transported when the cooking stove 12 is in the compact configuration.

Now with reference to FIGS. 4, 5, 5A, and 6, the burner knobs 58 may be positioned on the front panel 48 to correspond with the burners 56, such that, the number of burner knobs 58 may correspond with the number of burners 56 positioned within the main body 14. For example, the main body 14 may include two burners 56 positioned therein. As such, the front panel 48 may include two burner knobs 58 positioned thereon. The handle 20 may be positioned on the front panel 48 between the burner knobs 58, where, in some embodiments, the handle 20 may be centered on the front panel 48. In other embodiments, the handle 20 may be positioned on the rear panel 50, left panel 52, or right panel 54. The locking system 72 may be positioned partially on the front panel 48 and upper panel 70 and may include a lower portion 77 and upper portion 79. The lower portion 77 may be coupled to the front panel 48 of the main body 14 and the upper portion 79 may be coupled to the upper panel 70 of the lid 16. The lower portion 77 may be positioned directly below and in line (or aligned) with the upper portion 79 such that the lower portion 77 and upper portion 79 may lock to one another. The lower portion 77 may include the catch 73 sized and configured to hold and lock the latch 75 in place. The upper portion 79 may include the latch 75. The catch 73 may lock the latch 75 in place such that the front panel 48 and upper panel 70 may become flush or seated one with another. In this manner, the cooking stove 12 may be placed into the compact configuration. Now, the locking system 72 may include one or more locking systems 72, for example, the locking system 72 may include a first locking system 74 and a second locking system 76. The first and second locking systems 74, 76 may be positioned on opposite end portions of the front panel 48 and upper panel 70, where the burner knobs 58 and handle 20 may be positioned therebetween. In the compact configuration, the sizing of the adjacent handle 20 and the first and second locking systems 74, 76 may facilitate protecting or minimizing the burner knobs 58 being unintentionally bumped so that the burner knobs 58 may be less likely to brake or to be unintentionally rotated to an on position.

With reference to FIGS. 5, 5A, 6, and 6A, the burner knobs 58 may extend with a length 78 or diameter, where length 78 dimension may be defined to extend generally parallel to the front panel 48. Also, the locking system 72 may extend with length 80, where length 80 dimension may extend generally parallel to the front panel 48. The length 80 of the locking system 72 may be larger or expand beyond the length 78 dimension of the burner knobs 58, which may assist in protecting the burner knobs 58 from unwanted bumps to the burner knobs 58 when transporting and storing the cooking stove 12. Further, the burner knobs 58 may extend from the front panel 48 as shown by depth 82. The locking system 72 may extend from the front panel 48, as shown by depth 84, where depth 84 may extend further than depth 82 (or larger). The locking system 72 may extend with depth 84, which may be larger than depth 82 for the purpose of protecting the burner knobs 58. The handle 20 may extend from to the front panel 48, as shown by depth 86, where depth 86 may extend and be larger than depth 82 and depth 84. Further, the handle 20 may extend with depth 86, which is larger than depth 82 and depth 84, for the purpose of protecting the burner knobs 58. As such, depth 84 and depth 86 may be larger than depth 82 so that the sizing of the handle 20 and the locking system 72 may minimize unintentional bumping of the burner knobs 58 while transporting the cooking stove 12 or while placing the cooking stove 12 in storage, for example.

Figure 7:
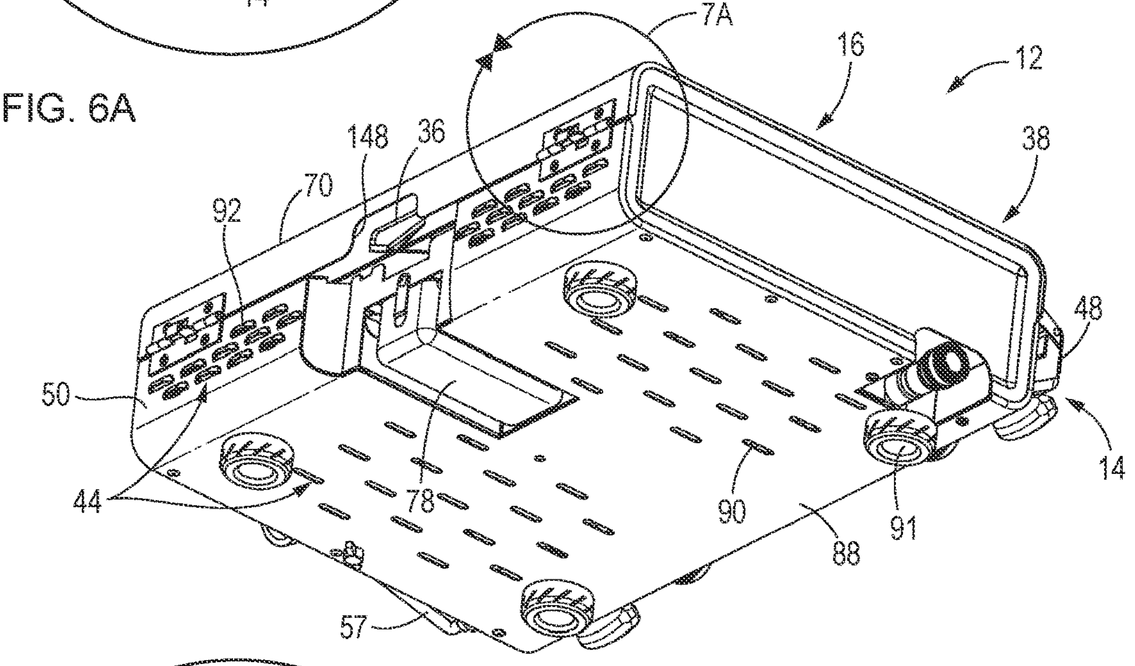
FIG. 7 is a bottom rear perspective view of the portable cooking stove, according to another embodiment of the present invention.
Figure 7A:
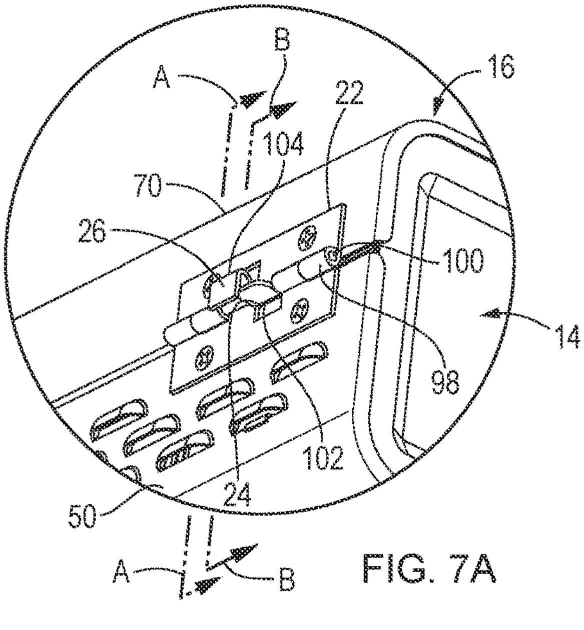
FIG. 7A is an enlarged view of the portable cooking stove taken from region 7A in FIG. 7, according to another embodiment of the present invention.
Figure 8:
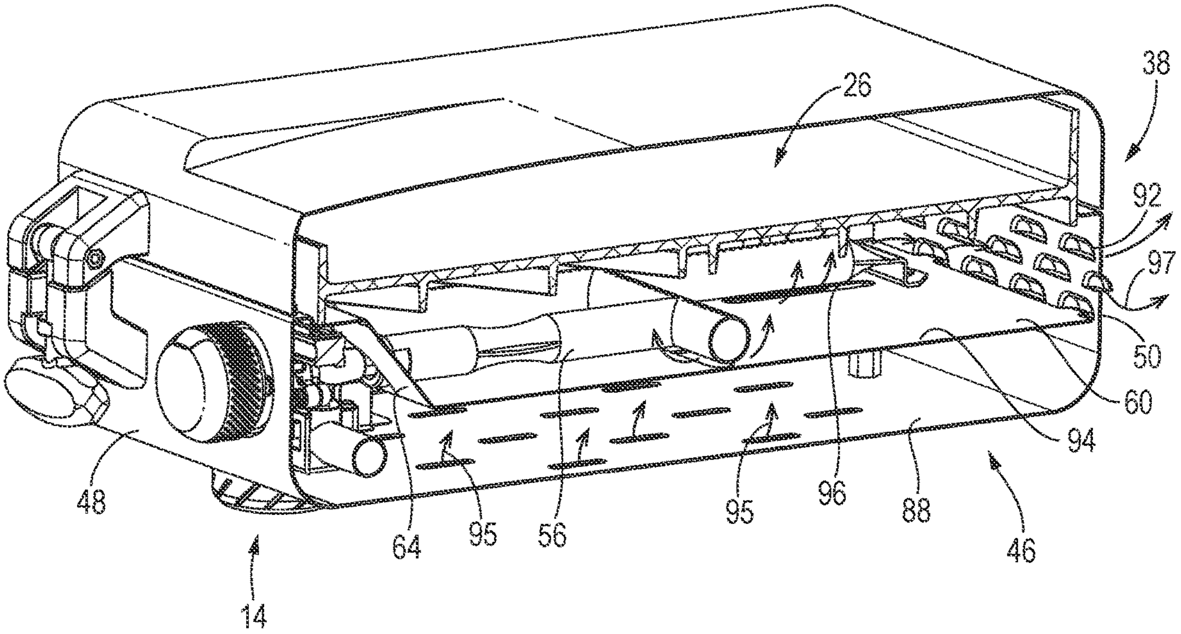
FIG. 8 is a cross sectional perspective view of the portable cooking stove taken from section line A-A in FIG. 5, depicting a ventilation system in the portable cooking stove, according to another embodiment of the present invention.
Figure 9:
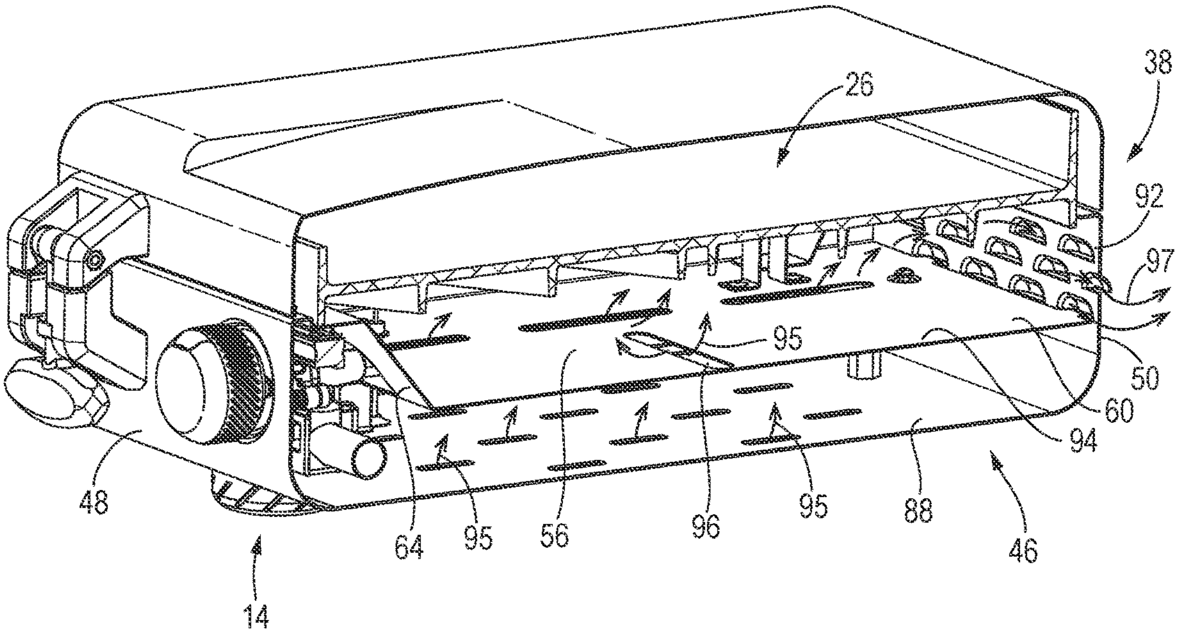
FIG. 9 is a cross sectional perspective view of the portable cooking stove taken from section line A-A in FIG. 5 (excluding a burner), depicting the burner vents of the ventilation system of the portable cooking stove, according to another embodiment of the present invention.
Figure 10:
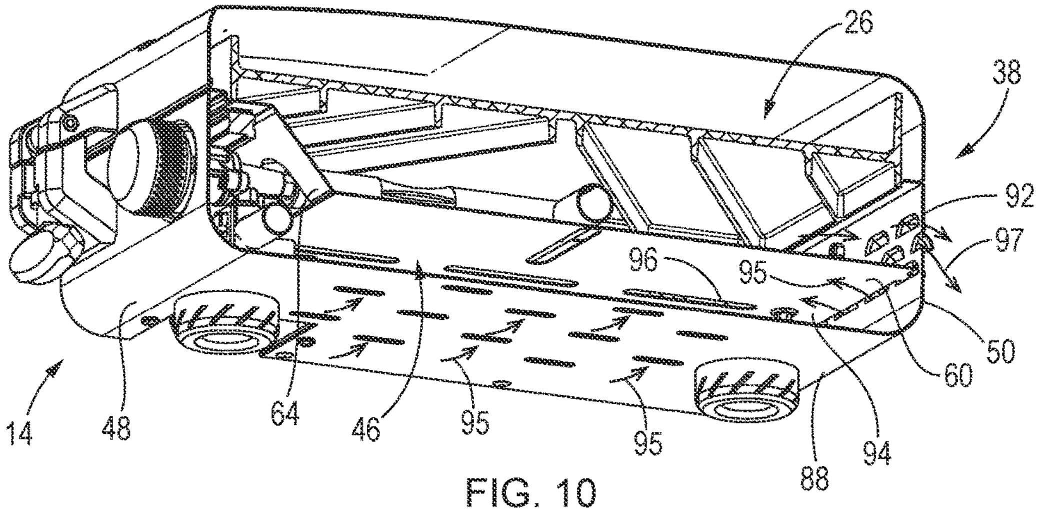
FIG. 10 is a cross sectional bottom perspective view of the portable cooking stove taken from section line A-A in FIG. 5, depicting other portions of the ventilation system of the portable cooking stove, according to another embodiment of the present invention.
Figure 11:
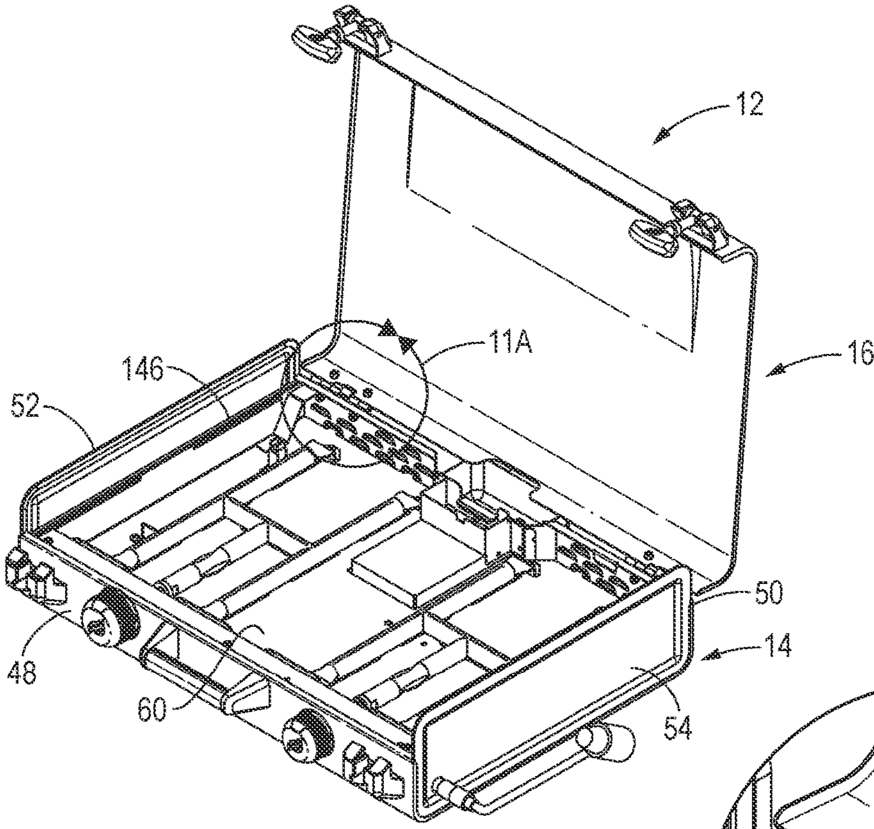
FIG. 11 is a front perspective view of the portable cooking stove, depicting the cooking stove in the open configuration (without a cooking surface or griddle therein), according to another embodiment of the present invention.
Figure 11A:
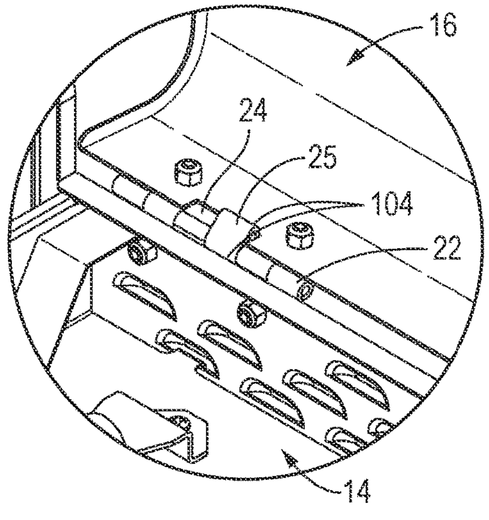
FIG. 11A is an enlarged perspective view of the portable cooking stove taken from region 11A of FIG. 11, depicting a hinge system of the cooking stove, according to another embodiment of the present invention.
Figure 12:
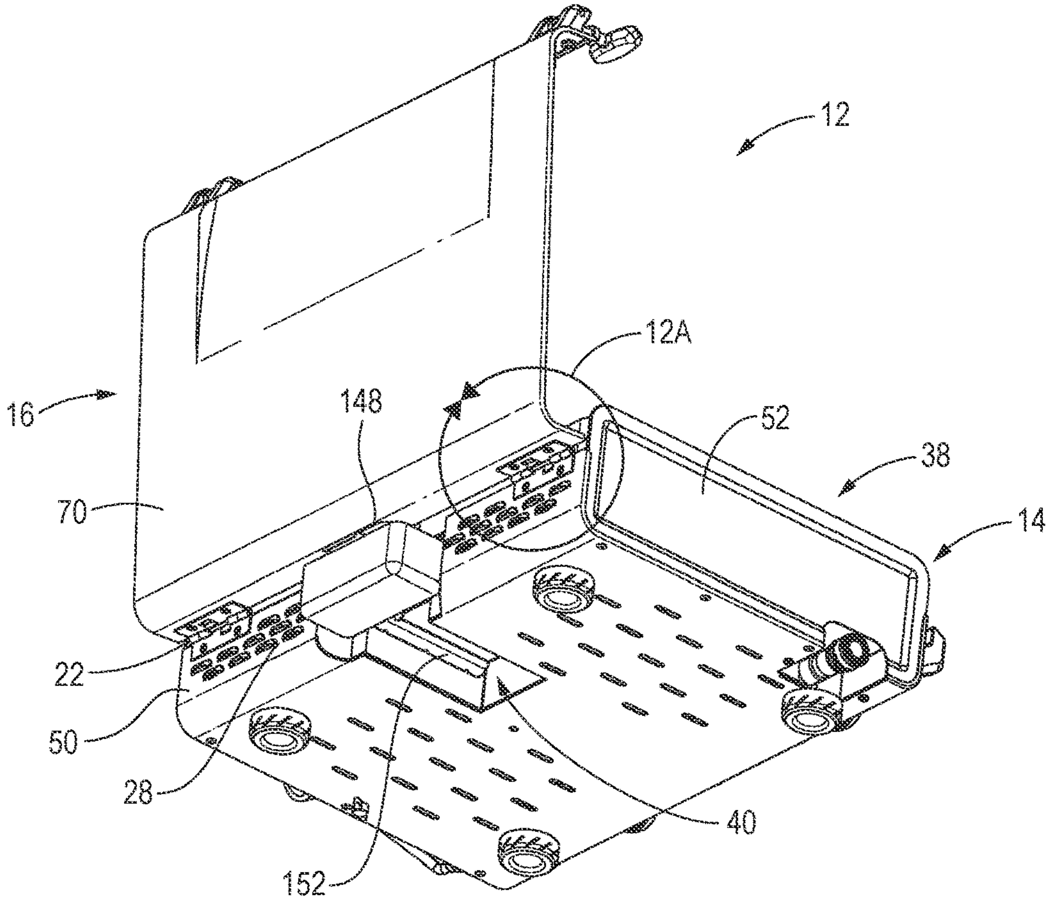
FIG. 12 is a rear perspective view of the portable cooking stove, depicting the cooking stove in the open configuration, according to another embodiment of the present invention.
Figure 12A:
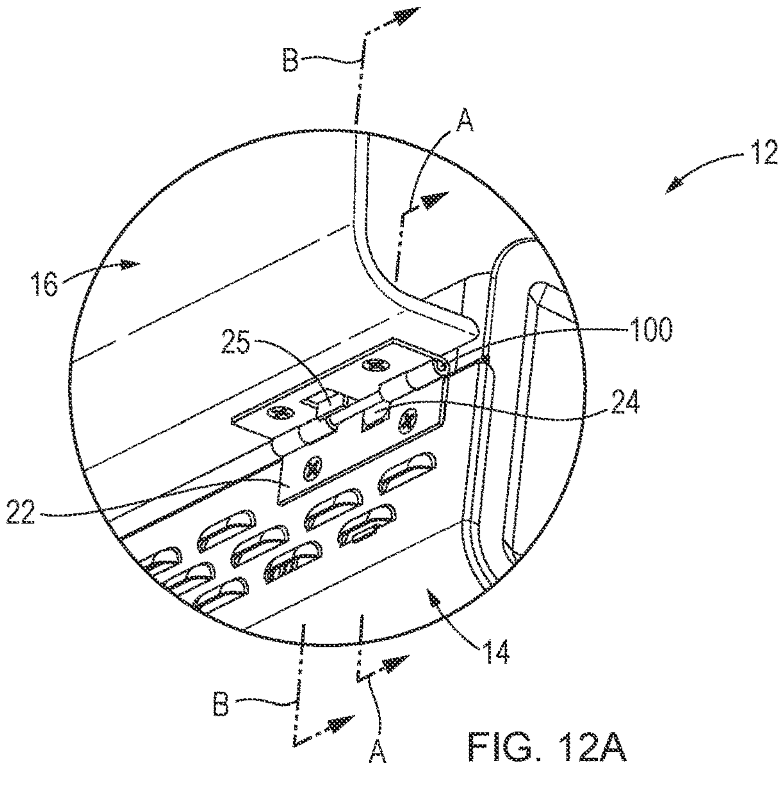
FIG. 12A is an enlarged view of the portable cooking stove taken from region 12A in FIG. 12, depicting the hinge system of the cooking stove, according to another embodiment of the present invention.
Figure 13:
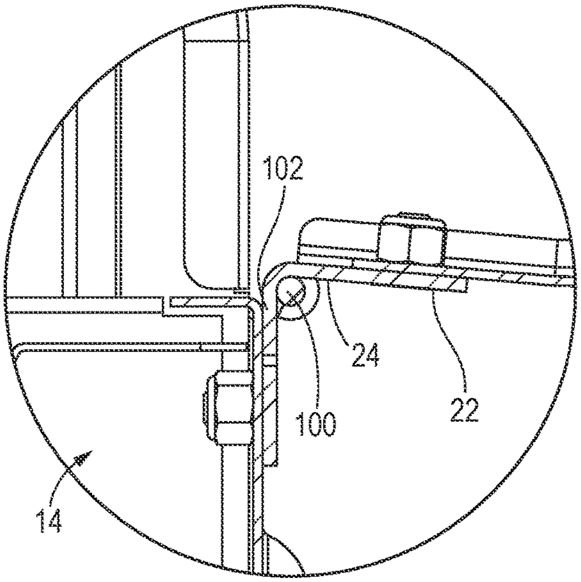
FIG. 13 is an enlarged cross sectional view of the portable cooking stove taken from section line A-A of FIG. 12A, according to another embodiment of the present invention.
Figure 14:
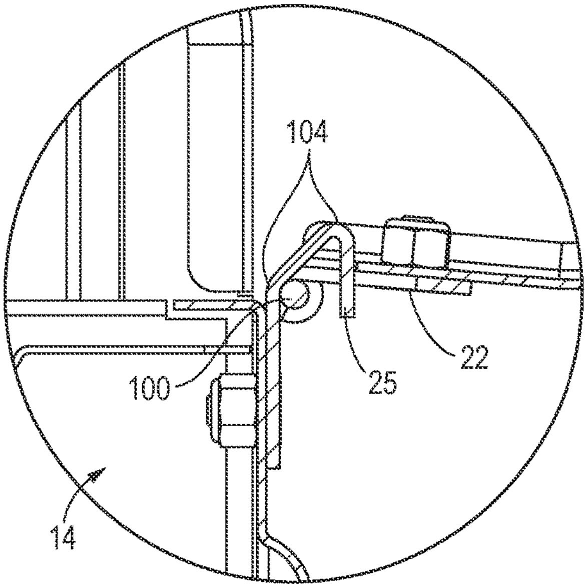
FIG. 14 is an enlarged cross sectional view of the portable cooking stove taken from section line B-B of FIG. 12A, according to another embodiment of the present invention.
Figure 15:
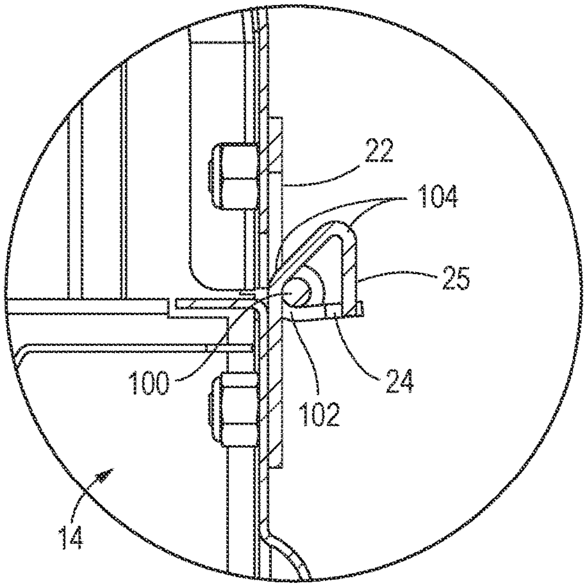
FIG. 15 is an enlarged cross sectional view of the portable cooking stove taken from section line A-A of FIG. 7A, according to another embodiment of the present invention.
Figure 16:
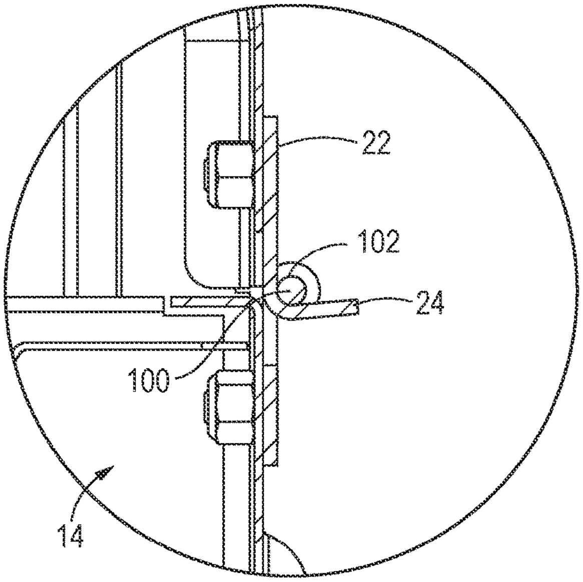
FIG. 16 is an enlarged cross sectional view of the portable cooking stove taken from section line B-B of FIG. 7A, according to another embodiment of the present invention.

Now with reference to FIGS. 4 and 7, as previously set forth, the cooking stove 12 may include the ventilation system 44 configured to draw and direct air into the main body 14 of the cooking stove 12 for feeding oxygen to the burners 56 as well as provide cooling to walls of the cooking stove 12 and further, draw or push air out of the main body 14. The main body 14 may include a lower panel 88 that may extend to the front panel 48, rear panel 50, left panel 52, and right panel 54. The lower panel 88 may be positioned opposite of the upper panel 70 and may extend at least partially or generally parallel with the upper panel 70. The lower panel 88 may extend to define lower vents 90 therein, or elongated holes, sized and configured to draw air from the exterior 38 of the main body 14 to the interior 46 of the main body 14, drawing air from the gap formed by feet 91 of the cooking stove 12. In some embodiments, the lower vents 90 may be positioned to provide air to burner vents 96 (see also, FIGS. 8, 10) defined in the inner tray 60 positioned directly below the burners 56 such that air from the exterior 38 may assist in providing oxygen to the burners 56. In other embodiments, the lower vents 90 may be positioned throughout the lower panel 88. The rear panel 50 of the main body 14 may include rear vents 92 extending along the length of the rear panel 50. The rear vents 92 may include upper rear vents and lower rear vents, the upper rear vents being defined as those rear vents 92 positioned above the level of the inner tray 60. Such upper rear vents may be sized and configured to facilitate air flow out of the interior 46 of the main body 14. The lower rear vents that may be positioned below the level of the tray 60 may also facilitate air to be drawn from the exterior, below the tray 60, and through the burner vents 96 to assist in providing oxygen to the burners 56 (see FIG. 10). As such, the ventilation system 44 may include each of the lower vents 90, the burner vents 96, and the rear vents 92 (which may be distinguished by lower and upper rear vents). The lower vents 90 and lower rear vents facilitate drawing air into the interior 46 of the main body 14 and below the inner tray 60 to then flow through the burner vents 96 to provide oxygen to the burners 56. The air may then be pushed or drawn through the upper rear vents of the rear vents 92 and out of the main body 14 of the cooking stove 12. In this manner, the ventilation system 44 of the cooking stove 12 may circulate air through the main body 14, provide oxygen to the burners 56, and assist in minimizing the temperature of various components of the cooking stove 12, which includes minimizing the temperature of the exterior surface of the main body 14.

With reference to FIGS. 7, 8, 9, and 10, as previously set forth, the inner tray 60 may be positioned in the interior 46 of the main body 14. The inner tray 60 may extend to define the front side 64, left side 66 (FIG. 4), and right side 68 (FIG. 4) so as to extend along the front panel 48, left panel 52 (FIG. 4), and right panel 54 (FIG. 4), respectively. Further, the inner tray 60 may include an inner panel 94 that may extend to the front side 64, left side 66 (FIG. 4), and right side 68 (FIG. 4) of the inner tray 60 such that the inner panel 94 may extend to the rear panel 50 of the main body 14. As previously set forth, the inner panel 94 may be positioned along the rear vents 92 so that some of the rear vents may be positioned lower than level with the inner panel 94 and some of the rear vents 92 may be positioned above the level of the inner panel 94 (see FIG. 10). In another embodiment, all of the rear vents 92 may be positioned above the level of the inner panel 94 of the inner tray 60. Further, the inner panel 94 of the inner tray 60 may be positioned directly below the burners 56 and above the lower panel 88 of the main body 14 such that the inner panel 94 may extend somewhat parallel to the lower panel 88 and the cooking surface 18. The inner panel 94 may include the burner vents 96 defined therein sized and configured to draw and direct air directly from below the inner tray 60 to the burners 56, as previously set forth. The burner vents 96 may be positioned directly below the burner 56 such that oxygen may be drawn and supplied directly to the burners 56, as depicted by arrows 95.

In some embodiments, the ventilation system 44 may include the lower vents 90 and rear vents 92 to draw and direct air into the interior 46 of the main body 14 through the lower vents 90 and then push air from the interior 46 of the main body 14 through the rear vents 92, as depicted by arrows 97. In other embodiments, the ventilation system 44 may include the lower vents 90, burner vents 96, and rear vents 92 to draw and direct air into the interior 46 of the main body 14, as depicted by arrows 95, and push air from the interior 46 of the main body 14 through the rear vents 92 positioned at a level above the inner tray 60, as depicted by arrows 97. The lower vents 90 may be configured to draw air into the interior 46 of the main body 14, where the inner panel 94 may be configured as a barrier or heat shield such that the air drawn into the interior 46 may not disrupt the heat source or burners 56. The burner vents 96 may be sized and configured to supply and funnel the air drawn into the interior 46 of the main body 14 to the burners 56 such that an appropriate amount of oxygen is provided to the burners 56, where the burners 56 may be gas burners fueled by propane or natural gas. The burner vents 96 may be positioned directly below the burners 56 such that air may be directed to the burner 56 and pushed around the burners 56 to provide oxygen thereto. As such, heat produced by the burners 56 may be directed towards the cooking surface 18 of the griddle 26 by the air that is drawn to the burners 56 through the burner vents 96. The heated air may then escape, at least partially, through the rear vents (above the inner panel 94) defined in the rear panel 50 of the main body 14 to an exterior 38 of the main body 14 and away from the user.

Now with reference to FIGS. 7 and 7A, the lid 16 may be coupled to the main body 14 by the hinge 22 where the hinge 22 may be sized and configured to move the lid 16 from a closed position to an open position. The hinge 22 may be partially coupled to the rear panel 50 of the main body 14 and the upper panel 70 of the lid 16 such that the lid 16 may be hingeably coupled to the rear panel 50 of the main body 14. In one embodiment, the hinge 22 may comprises at least two hinges, which may be coupled to the rear panel 50 and the lid 16. Further, the hinge 22 may be sized and configured such that the hinge 22 resists opening and closing without the assistance of the user. Even further, the hinge 22 may extend to include a holding portion 98 and rotating portion 100. The holding portion 98 may be sized and configured to hold the rotating portion 100 where the rotating portion 100 may be coupled to the lid 16 such that the rotating portion 100 may rotate in the holding portion 98. As the rotating portion 100 may rotate in the holding portion 98, the lid 16 may move from a closed to an open position.

With reference to FIGS. 7A and 11-16, the hinge 22 may include the open resistance structure 24 and the closing resistance structure 25. The open resistance structure 24 may include a bend 102 extending substantially close to a ninety-degree angle and perpendicular to the main body 14, upon the lid 16 being in the closed position. Further, the open resistance structure 24 may rotate with the rotating portion 100 such that, upon the lid 16 being in the open position, the open resistance structure 24 may extend parallel with the main body 14. Even further, the open resistance structure 24 may be sized and configured to resist the lid 16 from opening past a point such as past ninety degrees such that the lid 16 may extend at least partially perpendicular to the main body 14 in the open position. The closing resistance structure 25 may be stationary and include angled bends 104 sized and configured to resist the involuntary closing of the lid 16 when in the open position. The lid 16 may make contact with the angled bends 104 such that the lids 16 position may be held in the desired open position.

Figure 17:
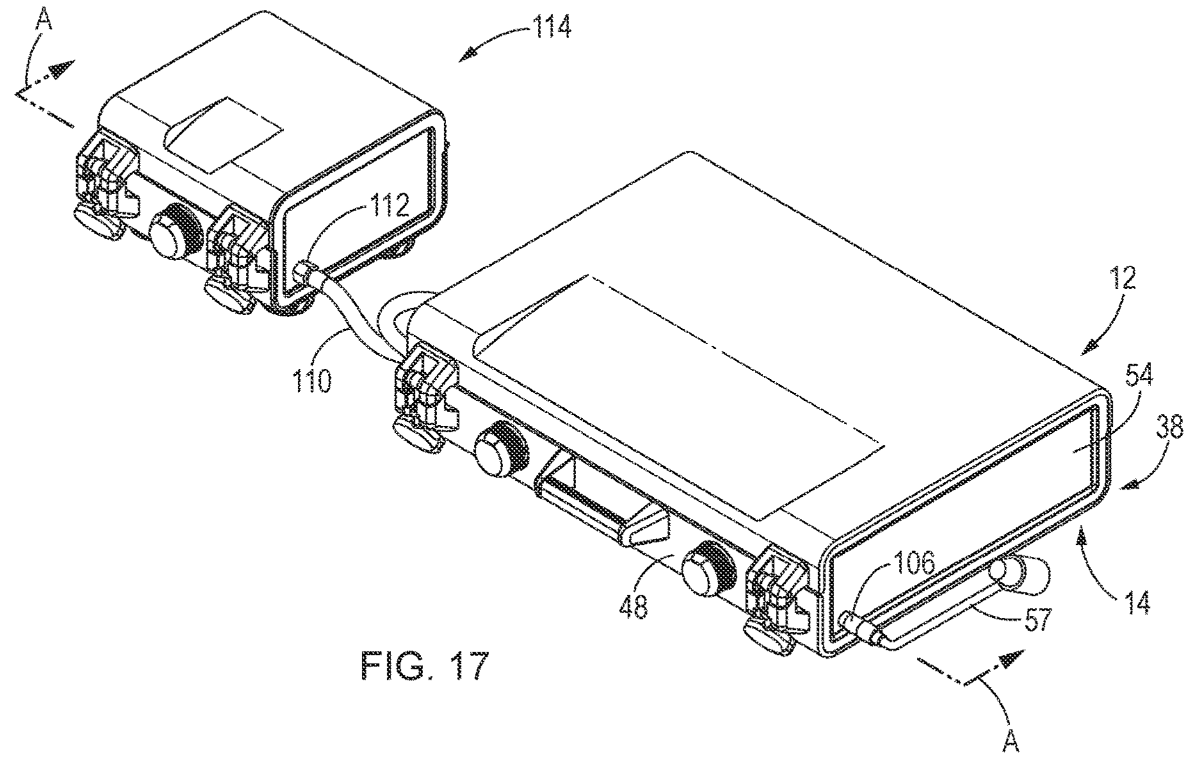
FIG. 17 is a perspective view of the portable cooking stove, depicting the portable cooking stove coupled to a secondary cooking stove, according to another embodiment of the present invention.
Figure 18:
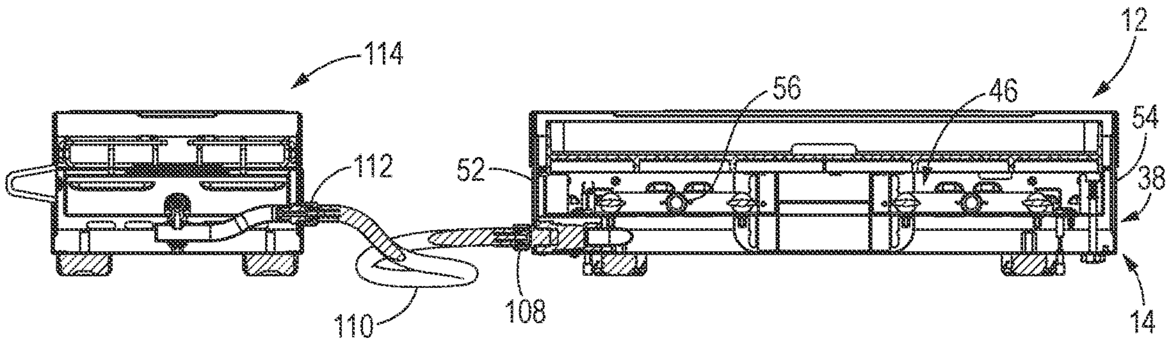
FIG. 18 is a cross sectional view of the potable cooking stove coupled to the secondary cooking stove taken from section line A-A of FIG. 17, according to another embodiment of the present invention.

Now with reference to FIGS. 7, 17 and 18, the cooking stove 12 may include a source inlet 106 and the regulator component 57 that may be sized and configured to connect to a fuel source, such as a propane tank or a natural gas line (not shown). The source inlet 106 may be coupled to a gas line which may be coupled to the burners 56 as previously stated above. Further, the source inlet 106 may be positioned on the exterior 38 of the main body 14 on the right panel 54 and the gas line may extend within the interior 46 of the main body 14 along the length of the front panel 48 such that the gas line may extend between the right panel 54 and the left panel 52 of the main body 14. The source inlet 106, regulator components 59, and gas line may be sized and configured to supply fuel to the burners 56 of the cooking stove 12. In addition, the left panel 52 of the main body 14 may extend to include a source outlet 108 or outlet coupling. The source outlet 108 may be an extension of the gas line which may extend out of the interior 46 of the main body 14 to the exterior 38 of the main body 14. Further, the source outlet 108 may be sized and configured to be removably coupled to a removable fuel line 110. The removable fuel line 110 may be configured to be removably coupled to the cooking stove 12 by the source outlet 108 and to a secondary cooking stove 114 by a secondary inlet 112. In such configuration, the fuel source, such as a propane tank, may supply fuel for both the cooking stove 12 and secondary stove 114 by the fuel flowing through the source inlet 106, gas line, source outlet 108, removable fuel line 110, and the secondary inlet 112. The secondary cooking stove 114 may be a smaller stove compared to the cooking stove 12, such that a sufficient amount of fuel may be provided to the secondary cooking stove 114. In this manner, the fuel for the cooking stove may simultaneously provide fuel for the secondary cooking stove 114 or, as desired, may provide fuel to only the cooking stove 12 or only the secondary cooking stove 114.

The removable fuel line 110 being coupled to the source outlet 108 of the cooking stove 12 may open the source outlet 108 such that fuel may flow through the source outlet 108 and into the removable fuel line 110. Further, the removable fuel line 110 may include an adapter such that the adapter may be positioned on the secondary source inlet 106 to allow for fuel to flow freely into the secondary cooking stove 114. In one embodiment, the secondary cooking stove 114 may include a secondary gas line which may extend partially into the secondary cooking stove 114. In another embodiment, the secondary gas line may extend from the secondary source inlet 106 to a secondary source outlet such that a secondary cooking stove may be attached to a secondary removable line which may be coupled to the secondary source outlet. In this configuration, a "daisy chain" of cooking stoves may be coupled to one another such that a primary fuel source may be used to fuel each of the respective cooking stoves. In one embodiment, the secondary cooking stove 114 may not require as much fuel to operate in comparison to the primary cooking stove, or portable cooking stove 12.

Now with reference to FIGS. 2, 4, 19, and 20, as previously set forth, the cooking stove 12 may include a griddle 26 positioned therein. In one embodiment, the cooking surface 18 associated with the cooking stove 12 may be a grill type or grate type cooking implement. In still another embodiment, the cooking surface 18 may be flat cooking surface of the griddle 26 and may be positioned to extend parallel with the lower panel 88 of the cooking stove 12. Further, the griddle 26 may be positioned in the interior 46 of the main body 14 such that the cooking surface 18 may be disposed below a height of the walls of the main body 14 and the lid 16, upon being in the use configuration, and fully encased within the main body 14 and lid upon being in the compact configuration. Even further, the griddle may extend to define an upper surface 118 (or cooking surface 18) and a lower surface 120 (or underside surface), the upper surface being surrounded by a raised splash guard. Such splash guard may extend to define a front guard 122, a rear guard 124, a left guard 126, and a right guard 128. The front guard 122, rear guard 124, left guard 126 and right guard 128 may be sized and configured to be a barrier from splatter of food debris and grease. Further, the front guard 122 and rear guard 124 may extend along opposite sides of the griddle 26 and may extend generally parallel relative to each other. Similarly, the left guard 126 and the right guard 128 may extend along opposite sides of the griddle 26 to extend generally parallel relative to each other. With the griddle positioned in the interior 46 of the main body, the left and right guards 126, 128 of the griddle 26 may extend adjacent a periphery of the left and right panels 52, 54 and the front and rear guards 122, 124 may extend adjacent a periphery of the front and rear panels 48, 50 of the main body 14. The upper panel 70 of the lid 16 may be sized and configured to extend at least partially parallel with the rear guard 124, front guard 122, and over the upper surface 118, such that, upon the lid 16 being in the closed position, the lid 16 may fully enclose the griddle 26.

The lower surface 120 of the griddle 26 may extend to define ribs 130 positioned thereon. The ribs 130 may be sized and configured to provide stability and structure such that the griddle 26 may be less prone to warping from the high heat and thermal stress provided by the burners 56 along with frozen food products that may be placed on the griddle 26. Further, the ribs 130 may extend in multiple patterns or positions along the underside surface of the griddle 26. For example, in one embodiment, the ribs 130 may extend with a vertical component directly downward from the underside surface of the griddle 26. In another embodiment, the ribs 130 may extend downward and along a periphery of the underside surface of the griddle 26. In another embodiment, the ribs may extend downward and diagonally between the left guard 126 and the right guard 128 on the lower surface 120 of the griddle 26. In another embodiment, the ribs 130 may extend from opposite corners such that an x-configuration may be defined by the ribs 130 along the lower surface 120 or underside surface of the griddle 26. In another embodiment, the ribs 130 may extend from opposite corners so as to extend diagonally from corner-to-corner to form the x-configuration with ribs 130 also extending from the splash guard along the periphery of the underside of the griddle 26. Such ribs 130 extending from the splash guard may just be an extension of the splash guard and may extend a similar distance beyond the underside surface of the griddle as the diagonally extending ribs 130. Even further, the ribs 130 may include one or more ribs 130 extending generally from one corner to the opposite corner of the lower surface 120 of the griddle 26 such that the one or more ribs 130 extending diagonally may extend parallel with each other so there are multiple x-configurations formed by the multiple parallel ribs 130 extending diagonally across the underside of the griddle 26. Such multiple parallel ribs 130 extending diagonally in a crisscross pattern may extend to exhibit multiple diamond shapes, such as four diamonds, centrally located along the underside surface of the griddle 26. The rib structure 130 set forth herein may provide similar or the same function as the rib structure or understructure of the griddle disclosed in commonly assigned U.S. Non-Provisional patent application Ser. No. 17/725,630, filed on Apr. 21, 2022, titled "COOKING STATION AND GRIDDLE WITH UNDERSTRUCTURE AND METHOD THEREOF," the disclosure of which is incorporated by reference herein in its entirety.

In one embodiment, as previously set forth, the griddle 26 may be secured to the main body 14 of the cooking stove 12 with a bolt 32 and a bolt inlet 34 defined in the griddle 26. The bolt 32 may extend as an elongated structure and may be referenced herein as an elongated structure. The bolt inlet 34 may be an opening defined in the griddle 26, the bolt 32 or elongated structure being sized and configured to rotate to facilitate engaging the bolt inlet 34 or opening defined in the griddle 26. Such bolt inlet 34 may be defined in an underside surface of the griddle 26 or the lower surface 120, such as a structure associated along an underside of the griddle 26. Further, the griddle 26 may extend to define tabs 30. Such tabs 30 may extend laterally relative to the ribs 130 so as to extend generally parallel relative to the underside surface of the griddle 26. Further, the tabs 30 may extend from the underside surface of the griddle 26 or one of the ribs 130 or from an extension of the splash guard, such as an extension of any one of the front, rear, left, or right guards 122, 124, 126, 128. In other embodiments, the tabs 30 may extend from the front, rear, left, or right guard 122, 124, 126, 128 such that the tabs 30 may be an extension of the front, rear, left, or right guards 122, 124, 126, 128.

Figure 20:
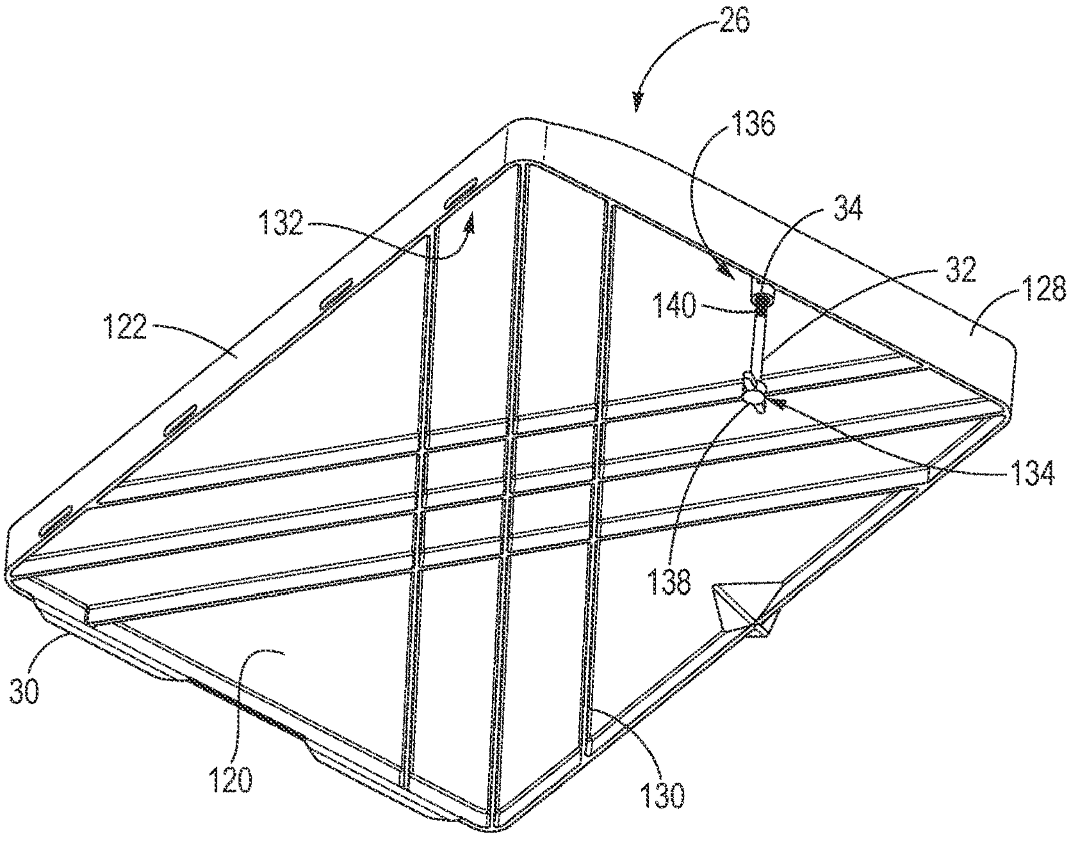
FIG. 20 is a bottom perspective view of the griddle, according to another embodiment of the present invention.
Figure 21:
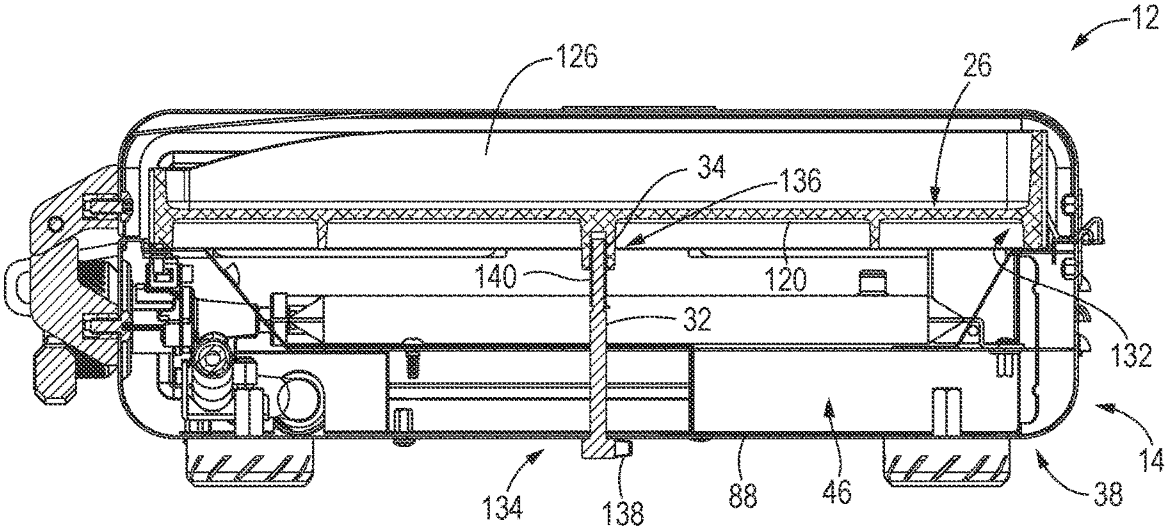
FIG. 21 is a cross sectional view of the portable cooking stove taken from section line B-B of FIG. 5, according to another embodiment of the present invention.
Figure 22:
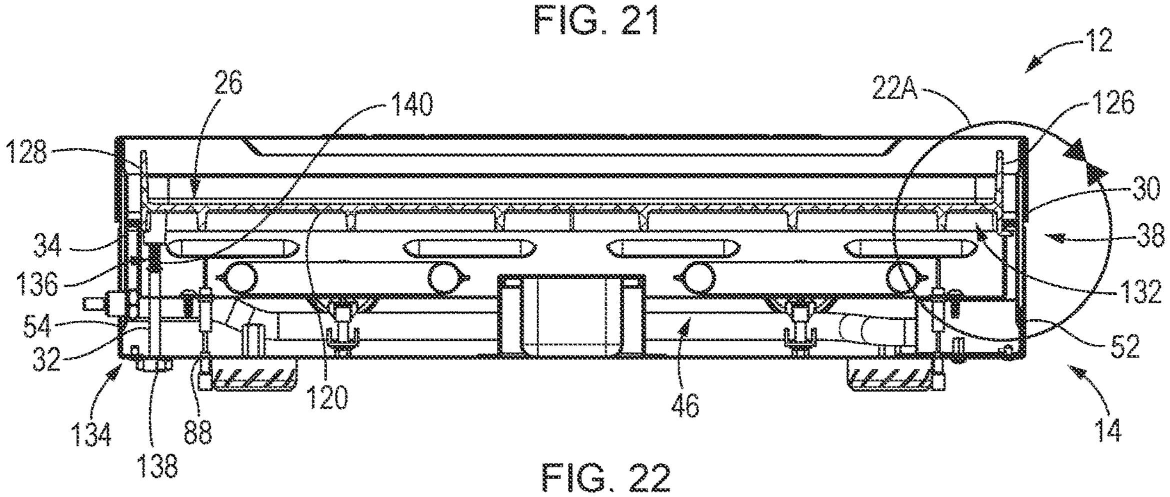
FIG. 22 is a cross sectional view of the portable cooking stove taken from section line C-C of FIG. 5, according to another embodiment of the present invention.
Figure 22A:
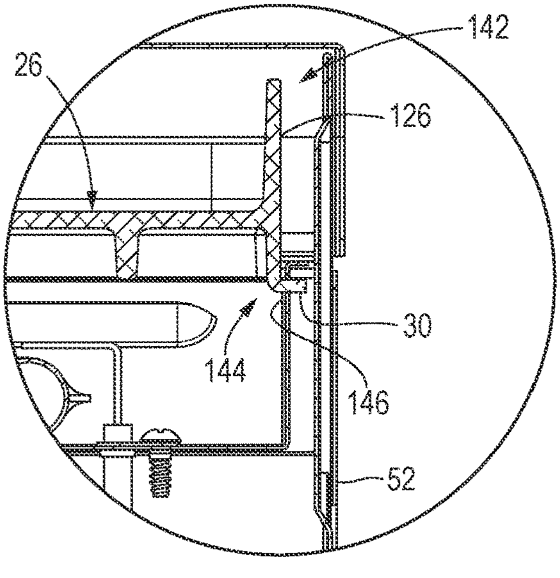
FIG. 22A is an enlarged cross-sectional view of the portable cooking stove taken from region 22A of FIG. 22, depicting tabs of the griddle positioned through tab openings defined in a panel, according to another embodiment of the present invention.
Figure 23:
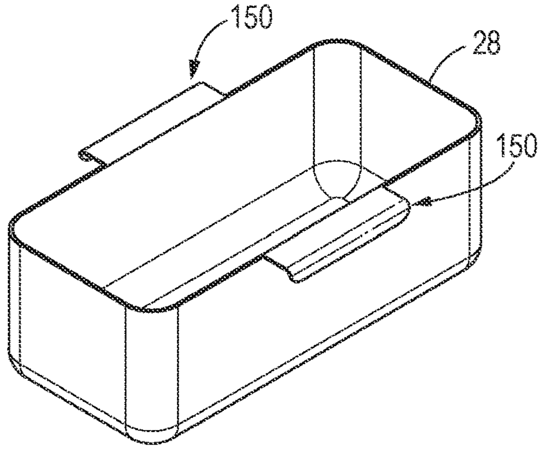
FIG. 23 is a perspective view of a grease cup, according to another embodiment of the present invention.
Figure 24:
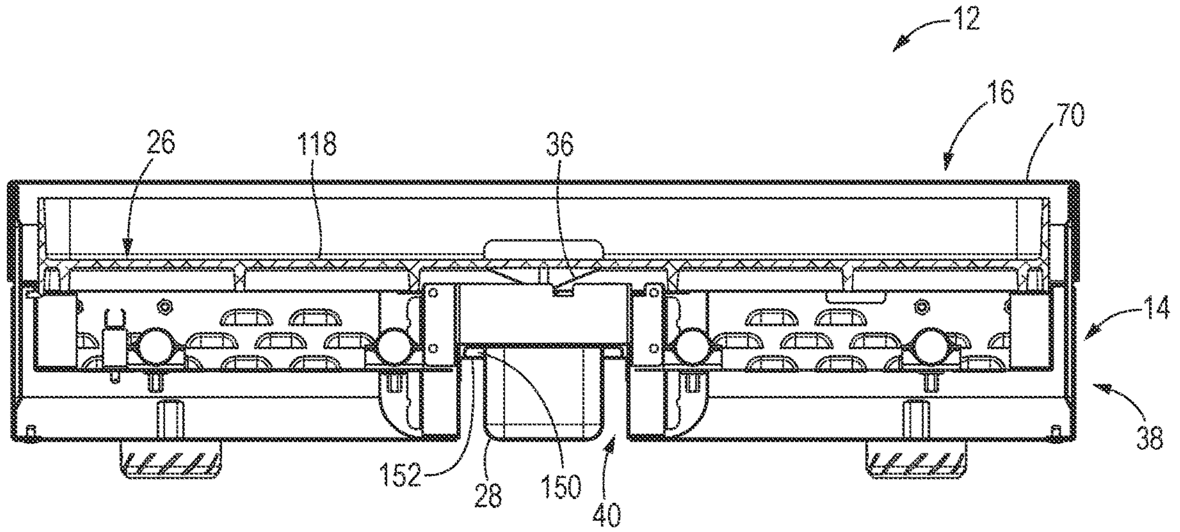
FIG. 24 is a cross sectional view of the portable cooking stove taken from section line D-D of FIG. 5, depicting the grease cup in a stow position, according to another embodiment of the present invention.

With reference to FIGS. 20-22, the bolt 32 and bolt inlet 34 may be sized and configured to secure the griddle 26 to the main body 14 such that the griddle 26 may be maintained in a fixed position during transport of the cooking stove 12. Further, the bolt 32 and bolt inlet 34 may be positioned along an edge 132 or adjacent the periphery of the lower surface 120 of the griddle 26. The bolt 32 and bolt inlet 34 may be positioned adjacent the edge 132 or periphery of the lower surface 120 of the griddle 26 near the left or right guard 126, 128. The bolt inlet 34 may be sized and configured to receive the bolt 32, where the bolt 32 may be removably coupled to the bolt inlet 34 by threading the bolt 32 into the bolt inlet 34. The bolt 32 may extend from the exterior 38 of the main body 14, or may extend from the lower panel 88 of the main body 14 to the bolt inlet 34 coupled to the griddle 26 such that the griddle 26 may be coupled to the main body 14 by the removable coupling of the bolt 32. Further, the bolt 32 may extend to define a first end 134 and a second end 136, where the first end 134 includes a head 138 and the second end 136 (or end portion) defines threads 140. Even further, the bolt 32 may include the head 138 positioned on an exterior 38 of the main body 14 such as the lower panel 88 of the main body 14, where the head 138 may be flush with the lower panel 88 when the bolt 32 may be threaded and tightened into the bolt inlet 34. The threads from the bolt inlet 34 may be unthreaded such that the bolt 32 may be loosened, where the bolt 32 being unthreaded from the bolt inlet 34 may allow for the griddle 26 to be lifted and removed from the main body 14. In this manner, upon removing the bolt 32 from the bolt inlet 34, the griddle 26 may be removed so that the interior 46 of the main body 14 may be accessed for cleaning purposes, for example.

With reference to FIGS. 4, 11, 22, and 22A, as previously set forth, the griddle 26 may include tabs 30. The tabs 30 may be an extension of the front, rear, left, or right guards 122, 124, 126, 128 and extend outwardly transverse or perpendicular relative to the front, rear, left, or right guards 122, 124, 126, 128. The front, rear, left, and right guards 122, 124, 126, 128 may extend to define an upper periphery 142 and a lower periphery 144 where the tabs 30 may be positioned on the lower periphery 144. The tabs 30 may extend such that there may be at least two distinct tabs 30 positioned on the same side of either the front, rear, left, or right guards 122, 124, 126, 128 and the tabs 30 may extend outward and away from the griddle 26. Further, the tabs 30 may be sized and configured to insert into tab inlets 146 positioned on the main body 14 or in the inner tray 60. The tab inlets 146 may be positioned on the interior 46 of the main body 14 on either the front, rear, left, or right panel 48, 50, 52, 54 of the main body 14 such that the tab inlets 146 may correspond with the tabs 30, upon positioning the griddle 26 within the interior 46 of the main body 14. The main body 14 may include the inner tray 60, in which case, the inner tray 60 may extend to include the tab inlets 146 such that the tabs 30 may be positioned therein. The tabs 30 and tab inlets 146 may be sized and configured to secure the griddle 26 to the main body 14 (along with the cooperation of the 32, previously set forth) of the cooking stove 12 such that the griddle 26 may be maintained and secured to the main body 14 during transport of the griddle 26 when the cooking stove 12 is in the compact configuration.

Figure 36:
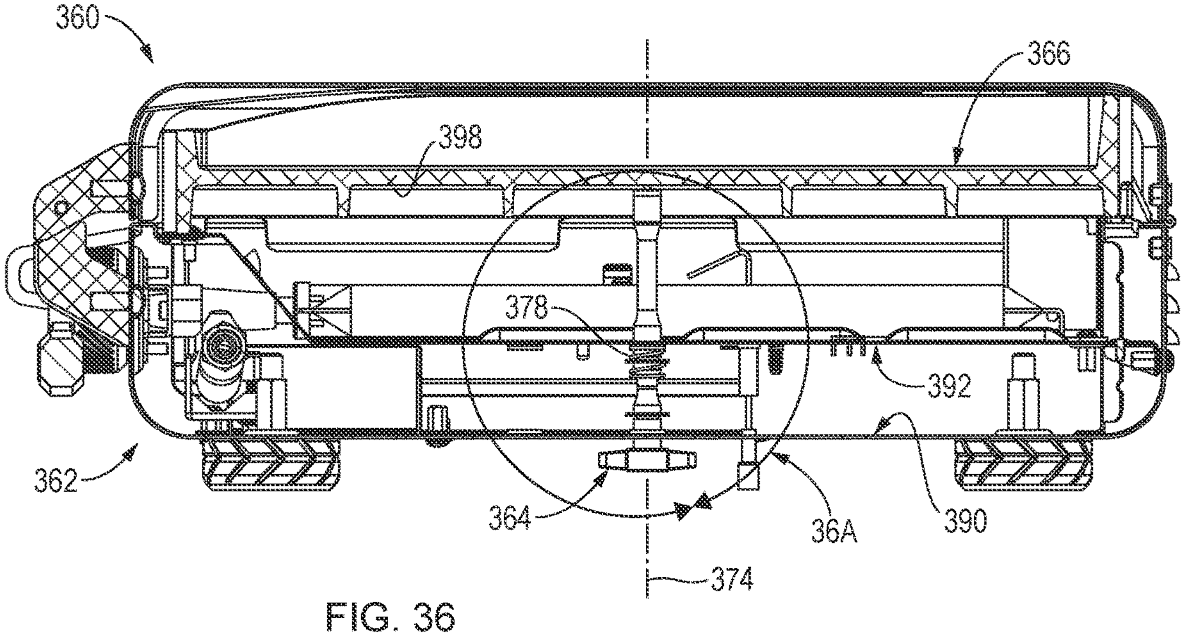
FIG. 36 is a cross-sectional view of a portable cooking stove taken along a section line adjacent the elongated structure, the elongated structure positioned within the cooking stove and depicting the elongated structure extending through a lower panel and an inner panel of the cooking stove.
Figure 36A:
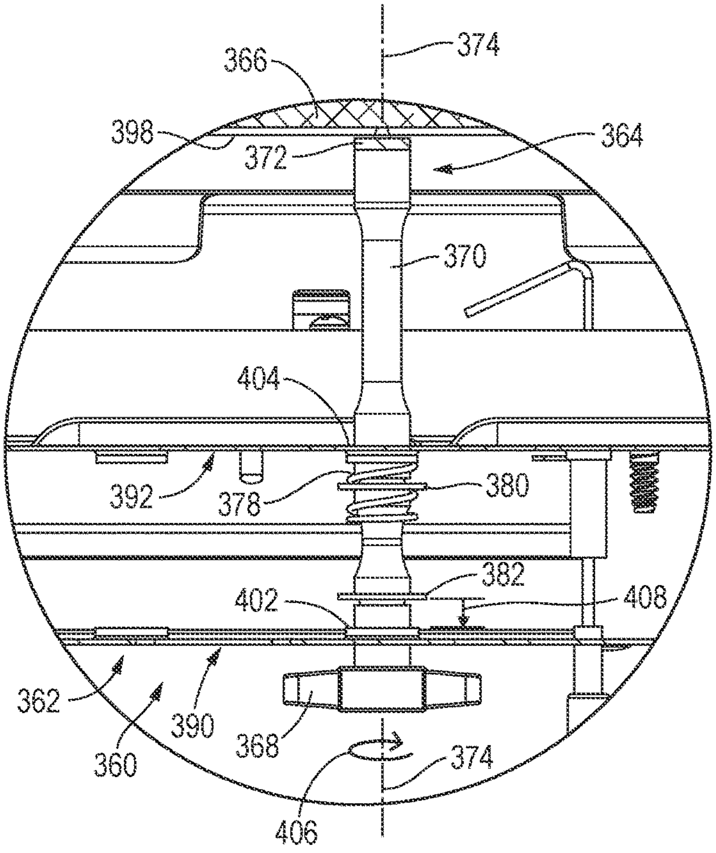
FIG. 36A is an enlarged view of the elongated structure and the cooking stove taken from region 36A of FIG. 36, depicting the elongated structure spring biased and in an engaged, locked position, according to another embodiment of the present invention.
Figure 37:
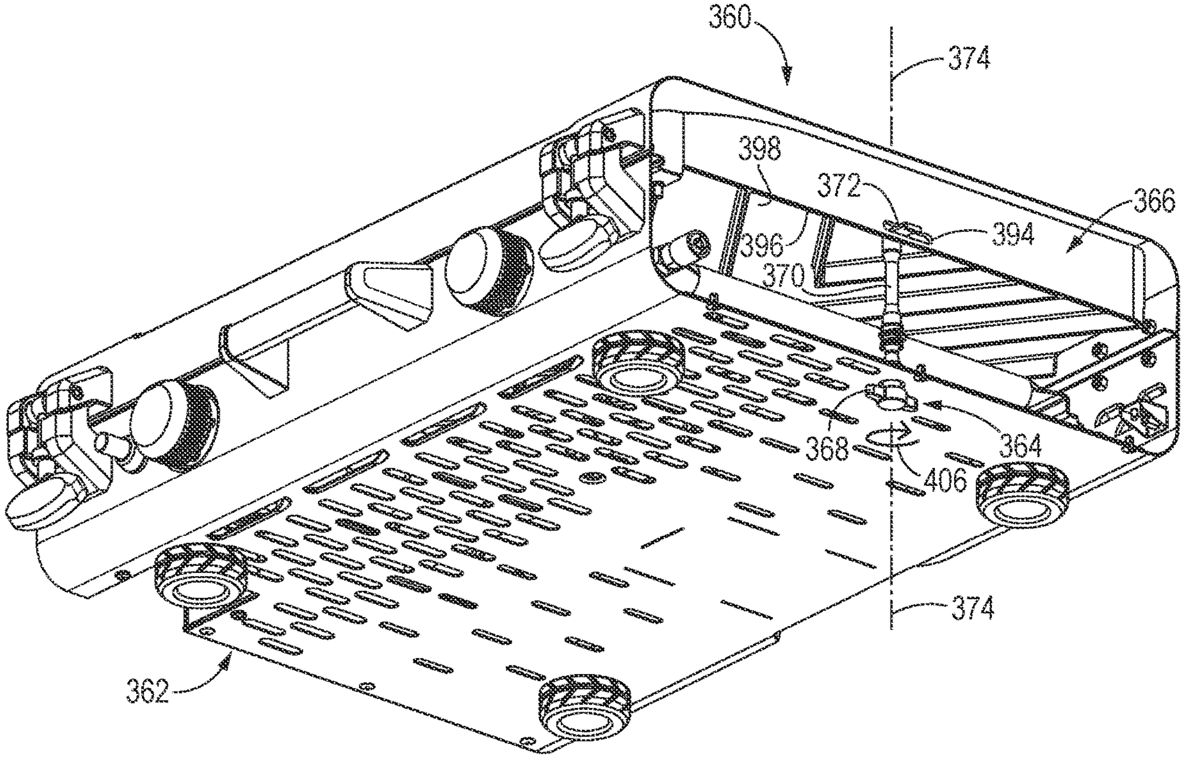
FIG. 37 is cross-sectional perspective view of the cooking stove taken along a section line adjacent the elongated structure (the view depicting the inner panel removed), depicting the elongated structure in the engaged position with an arm of the elongated structure positioned in a griddle opening of the griddle, according to another embodiment of the present invention.

The tabs 30 may be positioned on the opposite side of the griddle 26 than that of the bolt 32 and bolt inlet 34 such that the griddle 26 may be secured on either the left guard 126 and right guard 128, or, the front guard 122 and rear guard 124. The bolt 32 being untightened from the bolt inlet 34 may allow for the griddle 26 to lift upward on one side (the side of the bolt inlet 34) so that the tabs 30 may be pulled from the tab inlets 146 to, thereby, remove the griddle 26 from the cooking stove 12. In another embodiment, the bolt 32 or elongated structure may be spring biased to be held within the bolt inlet 34 (such that there may not be threads) in which the bolt 32 may be removed from being secured to the griddle 26 by manually compressing the bolt against a spring to then manually rotate the bolt to disengage the griddle 26, described further herein relative to FIGS. 36, 36A and 37.

Now with reference to FIGS. 7, 12, 23, and 24, the cooking stove 12 may include a removably coupled grease cup 28 positioned on an exterior 38 of the main body 14 that may be moved to a use position or a stow position. The stow position may be employed when transporting or storing the cooking stove. Further, the stowed position of the grease cup 28 may place the cooking stove 12 in the compact configuration. The use position of the grease cup 28 may be the position of the grease cup 28 when the cooking stove 12 is in use or a use position. The grease cup 28 may be positioned below the grease trough 36 of the griddle 26, where the grease trough 36 is configured to direct grease from the upper surface 118 or cooking surface 18 of the griddle 26 to the grease cup 28 and through a rear opening 37 (see FIG. 19) of the griddle 26. The rear opening 37 of the griddle 26 of the cooking stove 12 set forth herein may be sized and configured to effectively manage grease or food byproduct formed and collected while cooking food items. The functionality of the griddle 26 set forth for the cooking stove 12 may include some of the features and functionality of the various griddle embodiments disclosed in commonly assigned U.S. Pat. No. 10,327,589, filed on Dec. 21, 2018, titled "OUTDOOR COOKING STATION WITH GRIDDLE, SYSTEM AND METHOD THEREOF," as well as U.S. Pat. No. 10,327,588, filed on Apr. 29, 2017, titled "GRIDDLE DEVICE, SYSTEM, AND METHOD," the disclosures of which are incorporated by reference herein in their entirety.

The grease trough 36 of the griddle 26 being positioned on or adjacent the rear guard 124 (FIG. 19), the grease cup 28 may be sized and configured to be positioned along or adjacent to the exterior 38 of the rear panel 50 of the main body 14. Further, the upper panel 70 of the lid 16 may include a grease opening 148 (see FIG. 4) positioned and aligned to correspond with the grease trough 36 and the rear opening 37 of the griddle 26. The grease opening 148 may be sized and configured such that when the lid 16 is moved from a closed position to an open and upright position, the lid 16 does not block the grease trough 36 from directing grease to the grease cup 28. Further, the grease cup 28 may extend to define arms 150 extending from an outer wall of the grease cup 28. The arms 150 may extend perpendicular to the outer wall. Also, the grease cup 28 may include at least two arms 150 extending along opposite sides of the grease cup 28.

Figure 19:
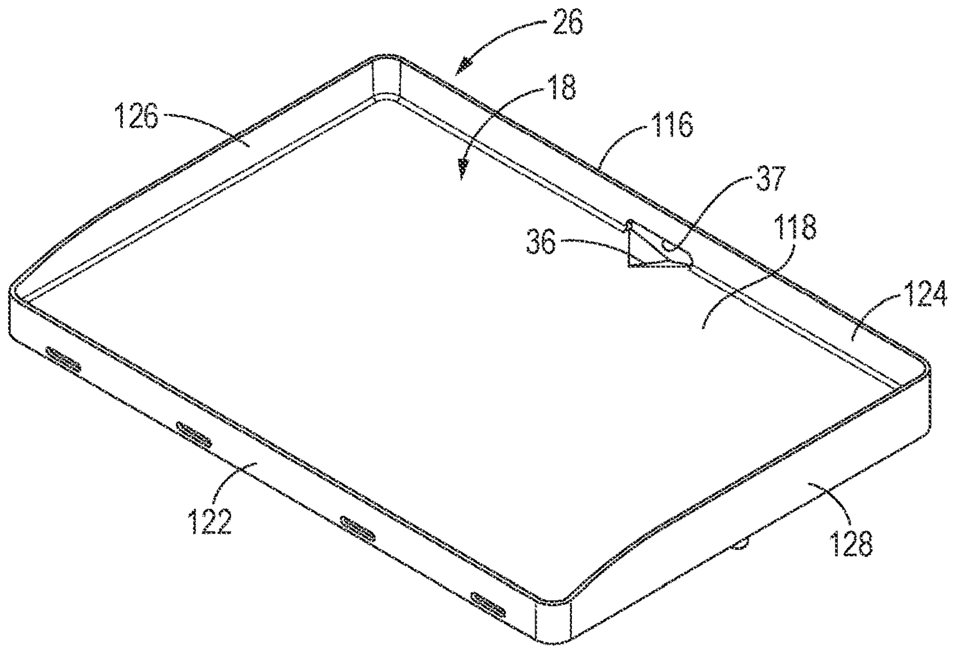
FIG. 19 is a top perspective view of a griddle, according to another embodiment of the present invention.
Figure 25:
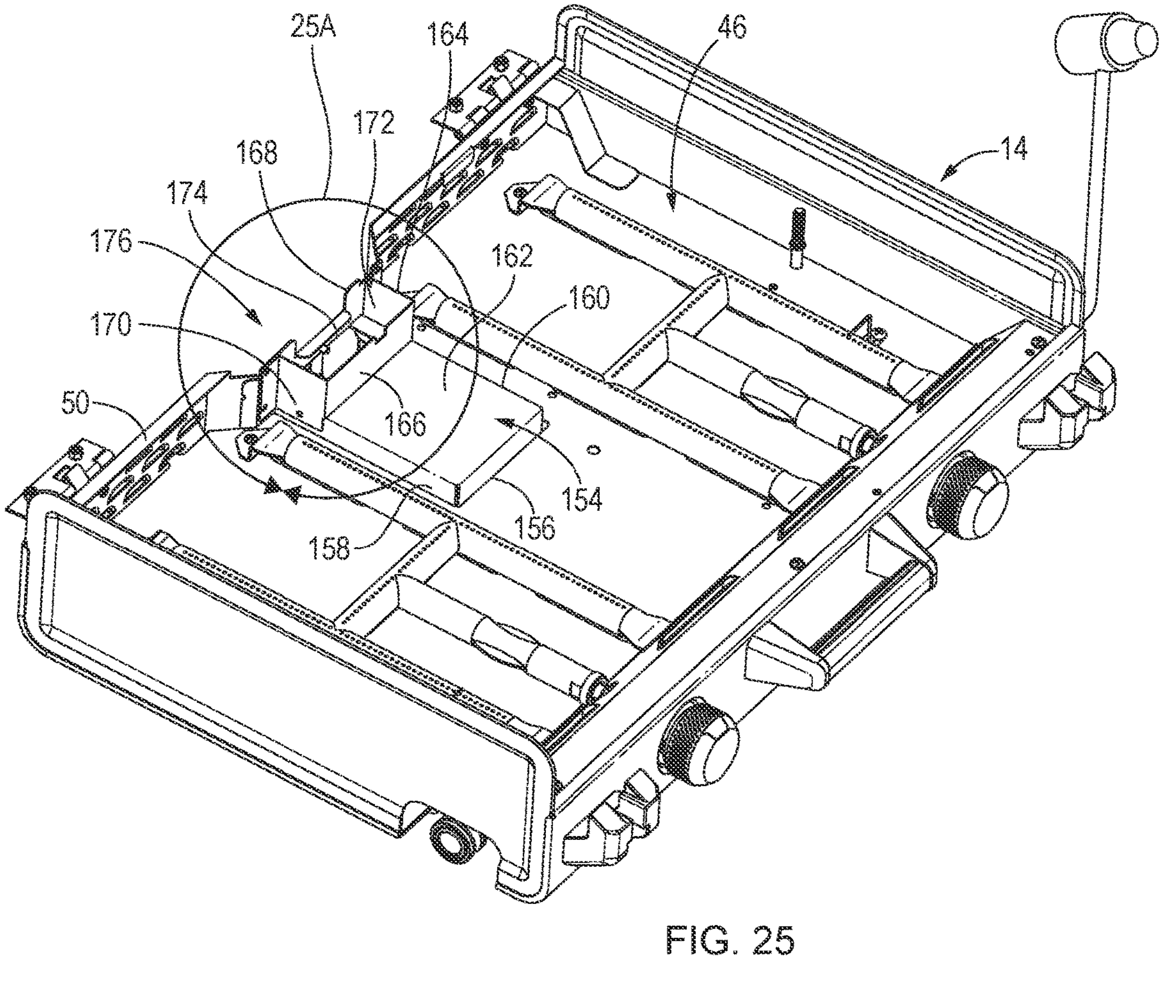
FIG. 25 is a perspective view of the portable cooking stove (with the lid, griddle, and grease cup removed), depicting a grease shield within the portable cooking stove, according to another embodiment of the present invention.
Figure 25A:
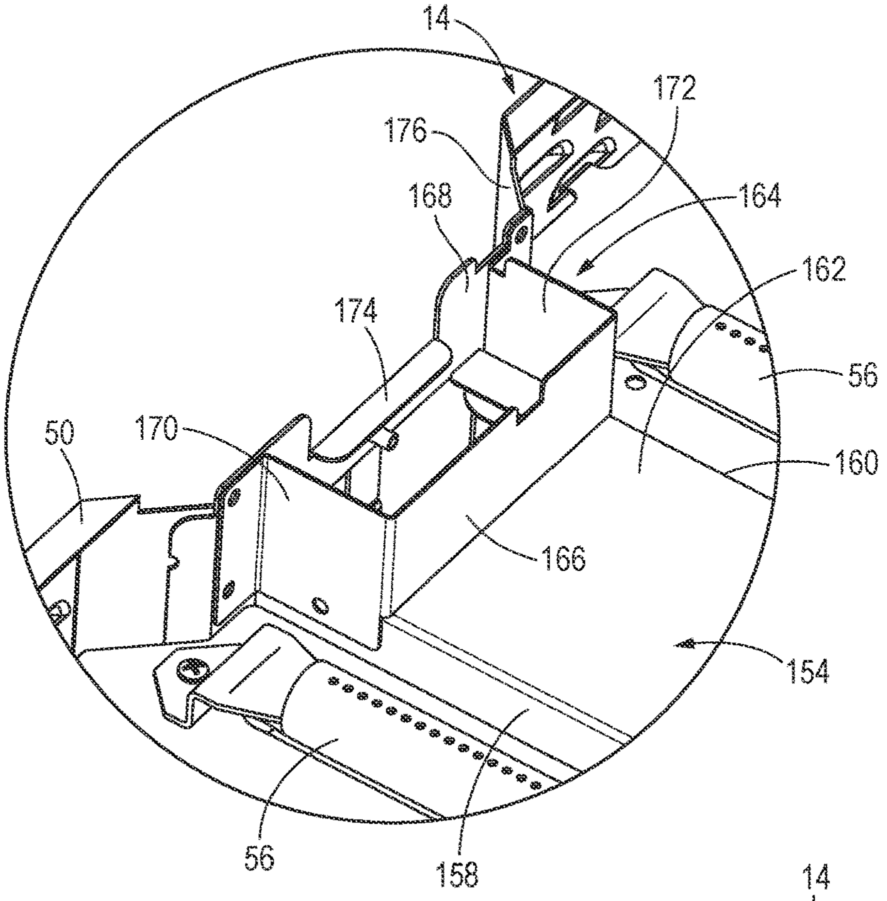
FIG. 25A is an enlarged view of the portable cooking stove taken from region 25A of FIG. 25, depicting the grease shield with a lip for holding the grease cup thereto, according to another embodiment of the present invention.
Figure 25B:
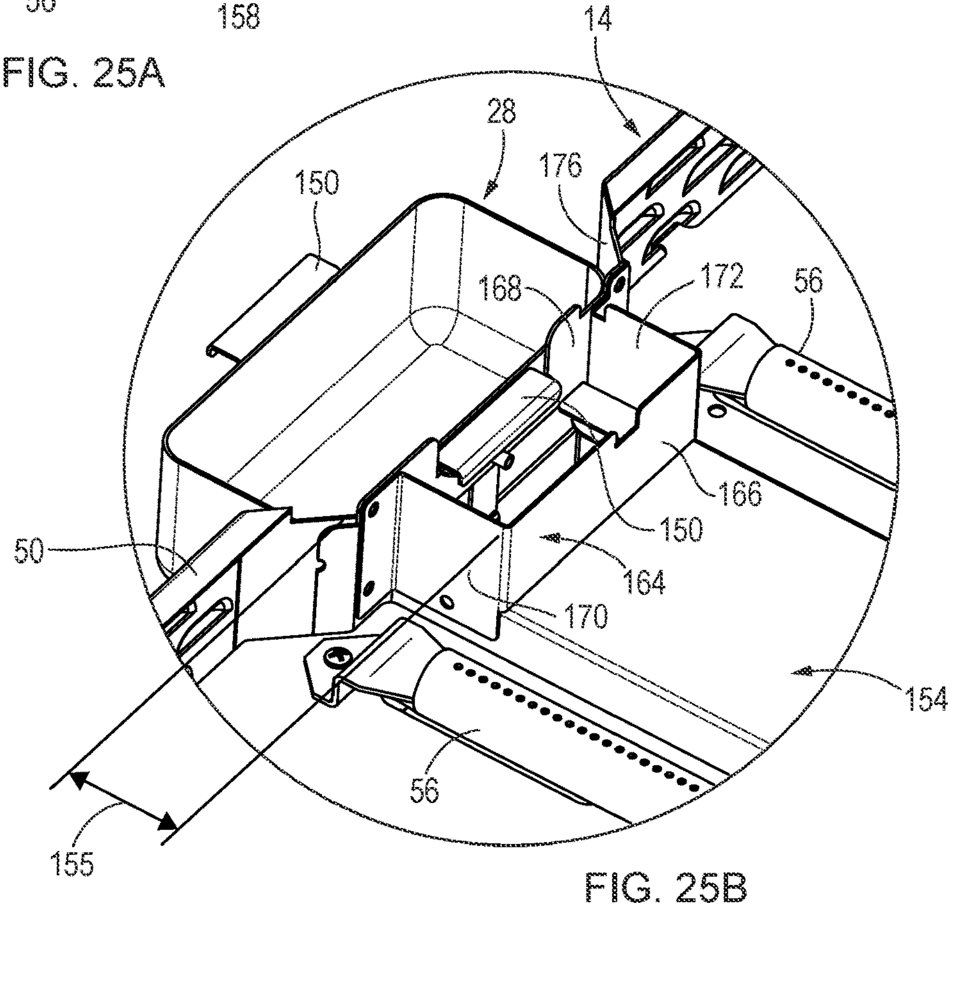
FIG. 25B is an enlarged view of the portable cooking stove, depicting the grease cup positioned adjacent the grease shield, according to another embodiment of the present invention.
Figure 26:
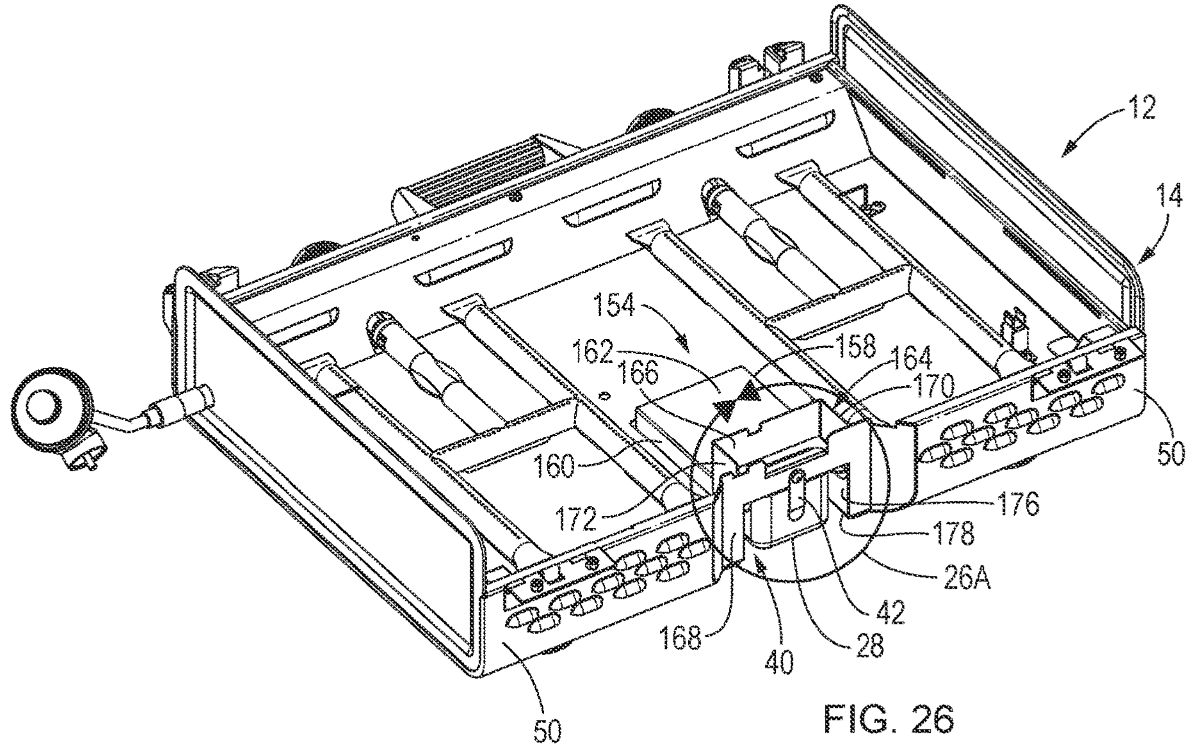
FIG. 26 is a rear view of the portable cooking stove (with the lid and griddle removed), according to another embodiment of the present invention.
Figure 26A:
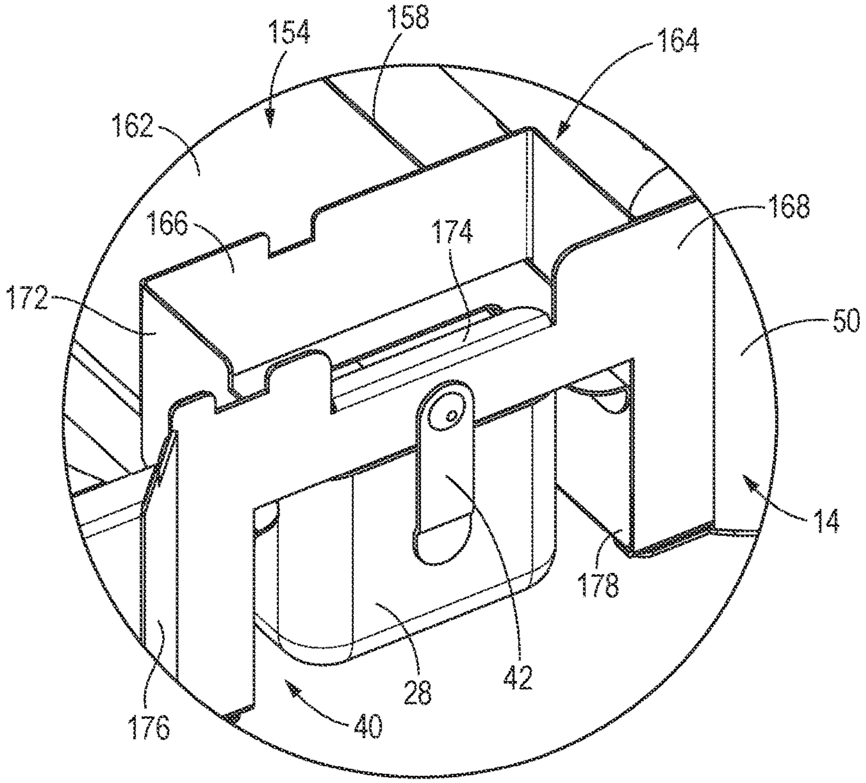
FIG. 26A is an enlarged view of the portable cooking stove taken from region 26A of FIG. 26, depicting the grease cup in the stow position, according to another embodiment of the present invention.

The arms 150 of the grease cup 28 may be configured to be positioned on an exterior 38 of the rear panel 50, such as a lip 174, of the main body 14 such that the grease cup 28 may hang on to the main body 14 in a use position (see also FIGS. 25A and 25B). Further, the main body 14 may extend to include the slot 40 or cavity sized and configured to store the grease cup 28 therein such that the grease cup 28 may be in the slot 40 in a stow position (see also FIG. 26A). The slot 40 may be sized and configured for the grease cup 28 to be secured to the main body 14 when the cooking stove 12 is in the compact configuration. Further, the slot 40 may be positioned along the exterior 38 of the main body 14 on either the rear, left, or right panel 50, 52, 54 such that the slot 40 may be positioned below the grease trough 36 where the grease trough 36 may be positioned on the rear, left, and right guard 124, 126, 128 (FIG. 19). L-brackets 152 may extend inwards from walls of the slot 40, where the L-brackets 152 may be sized and configured for the arms 150 of the grease cup 28 to be positioned and rest thereon when the grease cup 28 is in the stow position.

With reference to FIGS. 24, 25, 25A, 25B, 26 and 26A, the slot 40 may extend into the interior 46 of the main body 14. Further, the slot 40 may include walls 154 where the walls 154 may extend to define a frontward wall 156, left wall 158, right wall 160, and upper wall 162. The walls 154 may substantially separate the slot 40 from the interior 46 of the main body 14 such that the walls 154 may provide protection from heat escaping through the slot 40. The main body 14 may include a heat shield 164 extending from the upper wall 162 of the slot 40 to provide structure to form a gap between the burners 56 and the grease cup 28. Such heat shield 164 may extend to define a front shield 166, a rear shield 168, a left shield 170, and a right shield 172. The heat shield 164 may shield heat and flame of the burners 56 from the grease that may collect in the grease cup 28 as a safety measure. The heat shield 164 and its shield walls may provide a gap 155 or space that clearly separates the grease cup 28 from the interior of the main body 14 to minimize and substantially prevent any unwanted fires from the grease in the grease cup and the burners 56. The rear shield 168 may extend continuously with the rear panel 50 of the main body 14 and extend to define a lip 174. The lip 174 may be sized and configured for the arm 150 of the grease cup 28 to be positioned thereon when the grease cup 28 is in the use position. Further, the lip 174 may extend inwards towards the front shield 166 such that the arm of the grease cup 28 may be positioned thereon. The rear panel 50 may extend partially inwards to define an indent 176 where the indent 176 may be exhibited adjacent to the slot 40. The indent 176 may be sized and configured for the grease cup 28 to be positioned therein when in the use position such that the grease cup 28 may be positioned substantially below the grease trough 36 of the griddle 26. Further, the slot 40 may be sized and configured to receive the grease cup 28 in a different orientation than when the grease cup 28 is in the use position. The slot 40 may include the adjustable lever 42 positioned on the rear panel 50 of the main body 14 over an opening 178 of the slot 40. The adjustable lever 42 may be sized and configured to be moveable such that the adjustable lever 42 may be positioned over the opening 178 of the slot 40 or positioned to not obscure the slot 40. Further, the adjustable lever 42 being positioned over the opening 178 of the slot 40 may hold the grease cup 28 in the stow position and the adjustable lever 42 being moved to a position other than over the opening 178 of the slot 40 may allow for the grease cup 28 to be removed from the slot 40.

Figure 27:
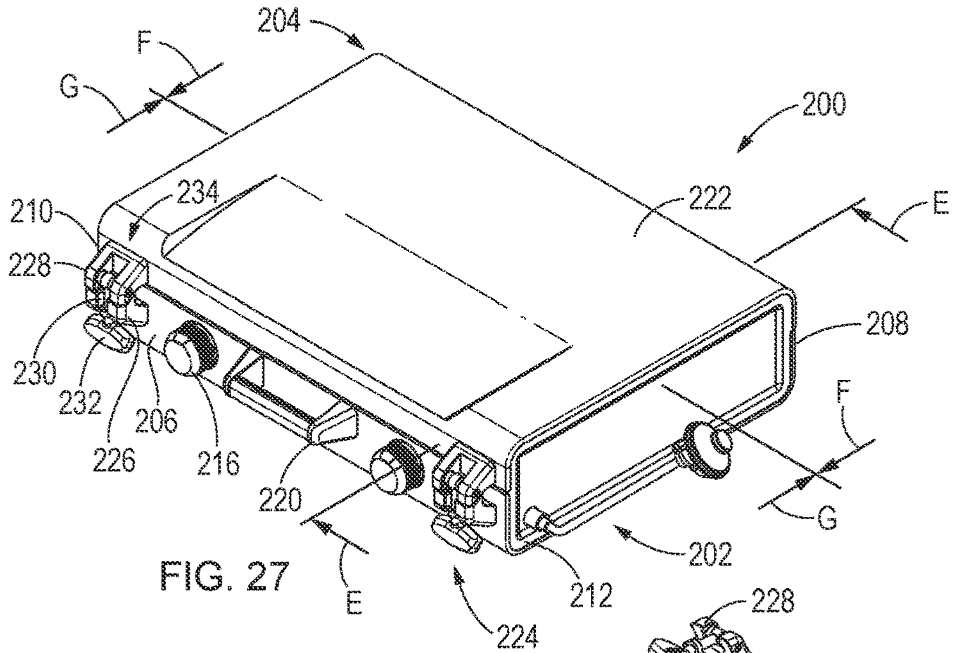
FIG. 27 is a perspective view of another embodiment of a portable cooking stove, depicting the cooking stove in a compact configuration, according to the present invention.
Figure 28:
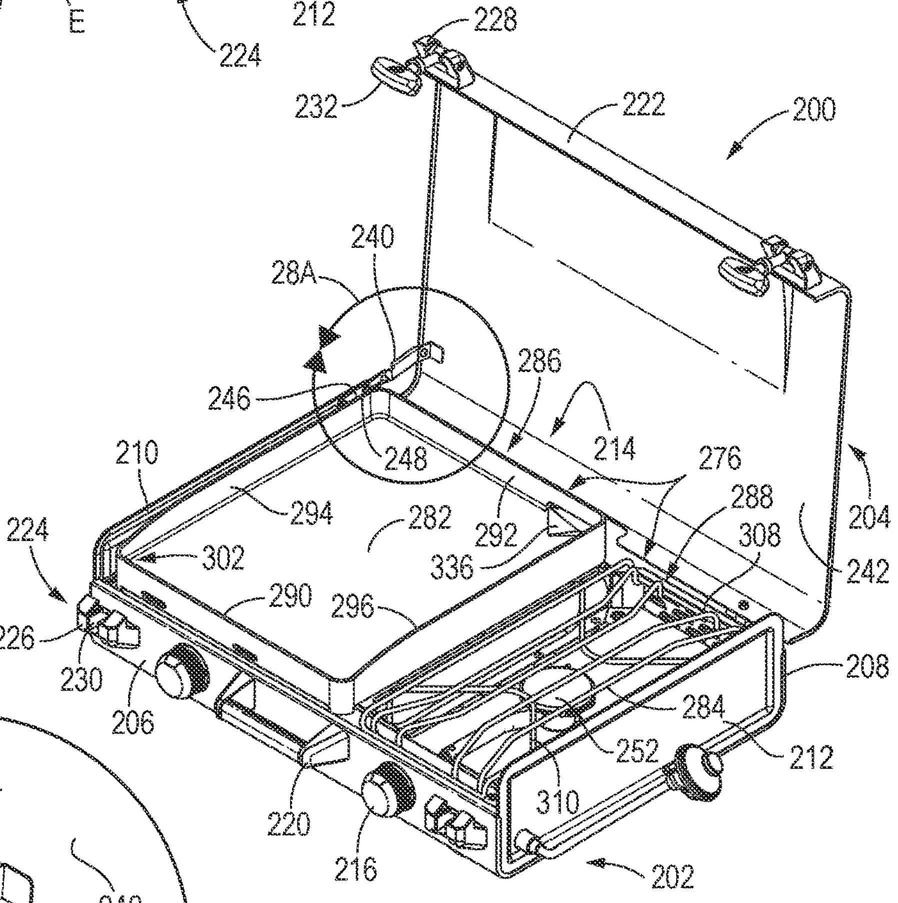
FIG. 28 is a perspective view of the portable cooking stove of FIG. 27, depicting the cooking stove in an open, use configuration, according to another embodiment of the present invention.

Now with reference to FIGS. 27 and 28, another embodiment of a portable cooking stove 200 is provided. As will be readily apparent, the cooking stove 200 of this embodiment may include similar functions and structure as that set forth in the previous embodiment. Further, similar to previously provided embodiments, the cooking stove 200 may include a main body 202 and a lid 204 hingeably coupled thereto. The main body 202 may define a front panel 206, a rear panel 208, a left panel 210, and a right panel 212 extending to define an interior 214. The front panel 206, rear panel 208, left panel 210, and right panel 212 may house various components and controls within the interior 214 of the main body 202 for the cooking stove 200 to appropriately operate and be functional. The front panel 206 may also be a control panel such that burner knobs 216 and an ignitor 218 may be positioned and coupled thereon. The ignitor 218 may also be integrated with the burner knobs 216 such that, upon the burner knobs 216 being rotated or moved, the ignitor 218 may generate a spark for igniting gas provided by turning the corresponding burner knob 216. The front panel 206 may include a handle 220 coupled thereto and positioned between the burner knobs 216. The handle 220 may be sized and configured to be employed when the cooking stove 200 may be in a compact configuration such that the cooking stove 200 may be carried via the handle 220 in a portable manner.

Figure 29:
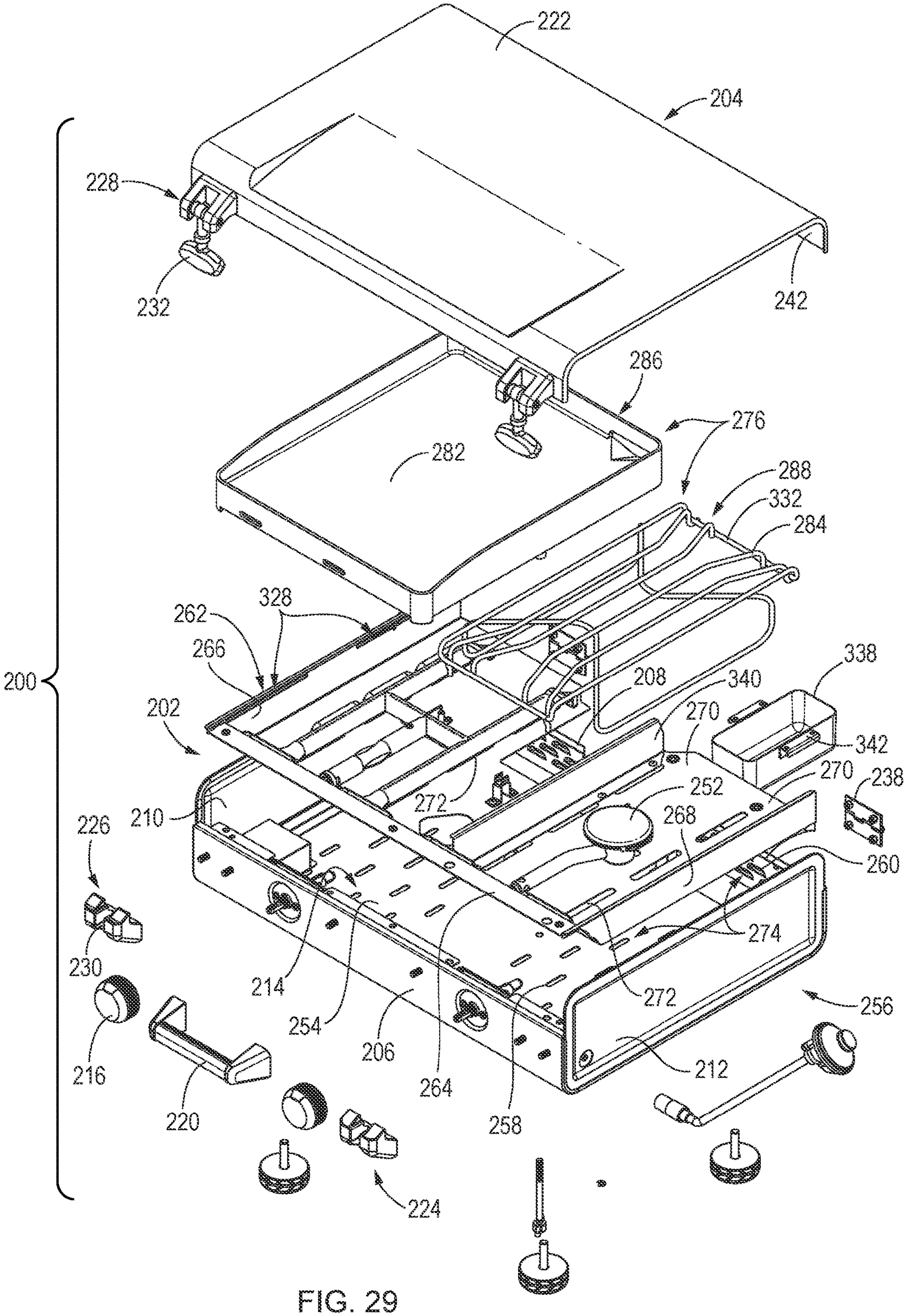
FIG. 29 is an exploded front perspective view of the portable cooking stove, according to another embodiment of the present invention.

With reference to FIGS. 27, 28, and 29, the lid 204 may be sized and configured to enclose the interior 214 of the main body 202 such that the cooking stove 200 may be in a compact configuration. Further, the lid 204 may extend to define an upper panel 222, such that upon the lid 204 being in a closed position, the upper panel 222 may extend from the rear panel 208 to the front panel 206 and, in one embodiment, may extend somewhat parallel to the main body 202. Upon the lid 204 being in an open position, the upper panel 222 may extend from the rear panel 208 so that the upper panel 222 may generally extend somewhat perpendicular to the main body 202. In this manner, upon the lid 204 being in the closed position, the cooking stove 200 may be in the compact configuration. In one embodiment, the compact configuration of the cooking stove 200 may exhibit a brief case type structure. In the compact configuration, the lid 204 may lock to the front panel 206 of the main body 202 by means of a locking system 224 or locking mechanism. The locking system 224 may define a lower portion 226 and an upper portion 228. The lower portion 226 may be coupled to the front panel 206 of the main body 202 and the upper portion 228 may be coupled to the upper panel 222 of the lid 204. In this manner, the lower portion 226 may be positioned directly below and aligned with the upper portion 228 such that the lower portion 226 and upper portion 228 may lock to one another. Further, the lower portion 226 may include a catch 230 and the upper portion 228 may include a latch 232. The catch 230 may be sized and configured to hold, grip, clasp or lock the latch 232 in place such that the lower portion 226 and upper portion 228 of the locking system 224 may be interconnected or locked. As such, the lid 204 may be locked to the main body 202 such that the cooking stove 200 may be in the compact configuration.

Figure 30:
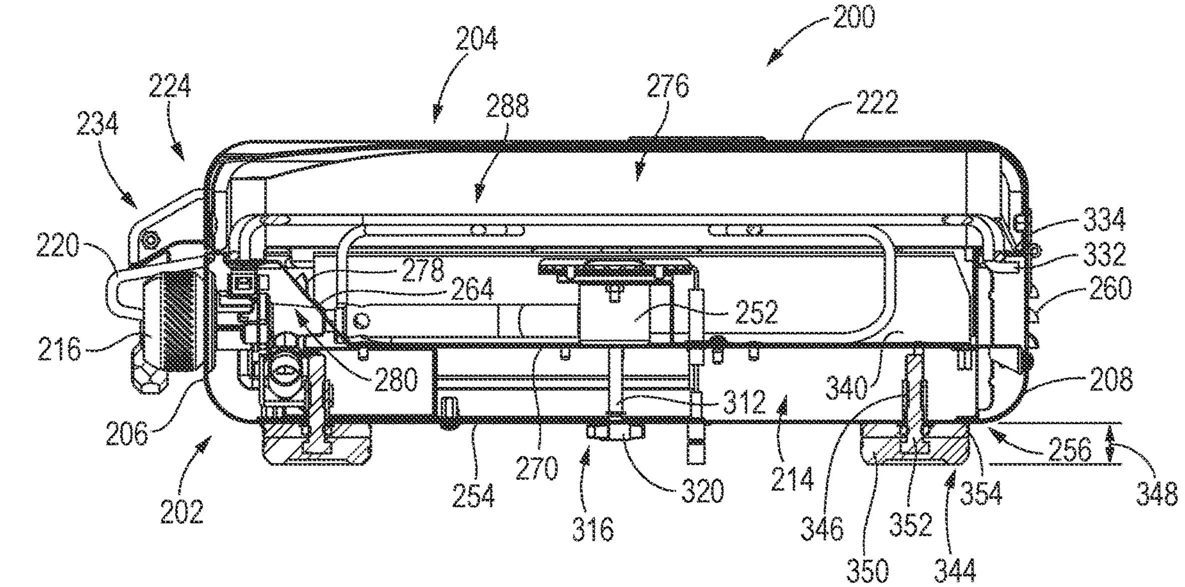
FIG. 30 is a cross sectional view of the portable cooking stove taken along section line E-E of FIG. 27, according to another embodiment of the present invention.

In some embodiments, with reference to FIGS. 27 and 30, the locking system 224 may include a first locking system 234 and a second locking system 236. The first and second locking systems 234, 236 may be positioned on opposite ends of the front panel 206 and upper panel 222, with the handle 220 and burner knobs 216 positioned therebetween. Similar to previously described embodiments, the locking system 224 and the handle 220 may be sized to protrude from the front panel 206 and/or the upper panel 222 beyond an outer surface of the burner knobs 216. In another embodiment, the locking system 224, or more specifically, the first locking system 234 and second locking system 236, and the handle 220 may be sized and configured to protect the burner knobs 216 from unintentional bumping or the like during transport.

Figure 28A:
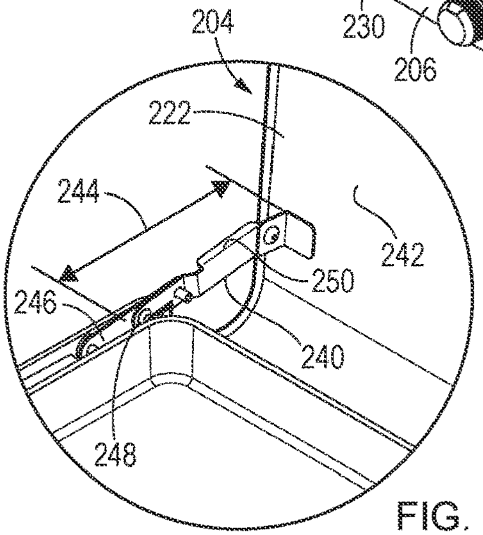
FIG. 28A is an enlarged view of the portable cooking stove taken from region 28A of FIG. 28, depicting a folding hinge fully extended, according to another embodiment of the present invention.

With reference to FIGS. 28, 28A, and 29, the upper panel 222 of the lid 204 may be hingeably coupled to the rear panel 208 by means of hinges 238 such that the lid 204 may be moveable between the closed position and the open position so as to move the cooking stove 200 between a compact configuration and a use configuration, respectively. In one embodiment, the hinges 238 may be similar to the previous embodiments provided herein. In another embodiment, the cooking stove 200 may include a folding hinge 240. The folding hinge 240 may be coupled to an underside 242 of the upper panel 222 of the lid 204 and to either the left panel 210 or right panel 212 of the main body 202. The folding hinge 240 may be sized and configured to extend with a length 244 such that, upon the lid 204 being in an open position, the folding hinge 240 may be fully extended with its given length 244. In this configuration, the folding hinge 240 may provide resistance against the lid 204 from overextending towards the rear panel 208. With the folding hinge 240 in this extended position, the lid 204 may be maintained in the open position or an upright position. The folding hinge 240 may be coupled to a reinforcement portion 246 at a joint 248. The joint 248 may be the coupling between the reinforcement portion 246 and the folding hinge 240. The reinforcement portion 246 may be configured to provide structure and stability to the folding hinge 240. The joint 248 may facilitate the folding hinge 240 to fold or bend such that the lid 204 may be moved from the open position to the closed position. Upon the folding hinge 240 being moved to a folded position, the lid 204 may be in the closed position such that the folding hinge 240 may extend generally towards the front panel 206 and parallel to the reinforcement portion 246. Upon the folding hinge 240 being in an open position, the lid 204 may also be in the open position such that the folding hinge 240 may extend generally towards the rear panel 208. The folding hinge 240 may include a flap extension 250 configured to be positioned between the left panel 210 (or right panel 212), and the upper panel 222 of the lid 204 such that the left panel 210 and upper panel 222 may not rub continuously on one another when the lid 204 may be in the closed position.

Figure 31:
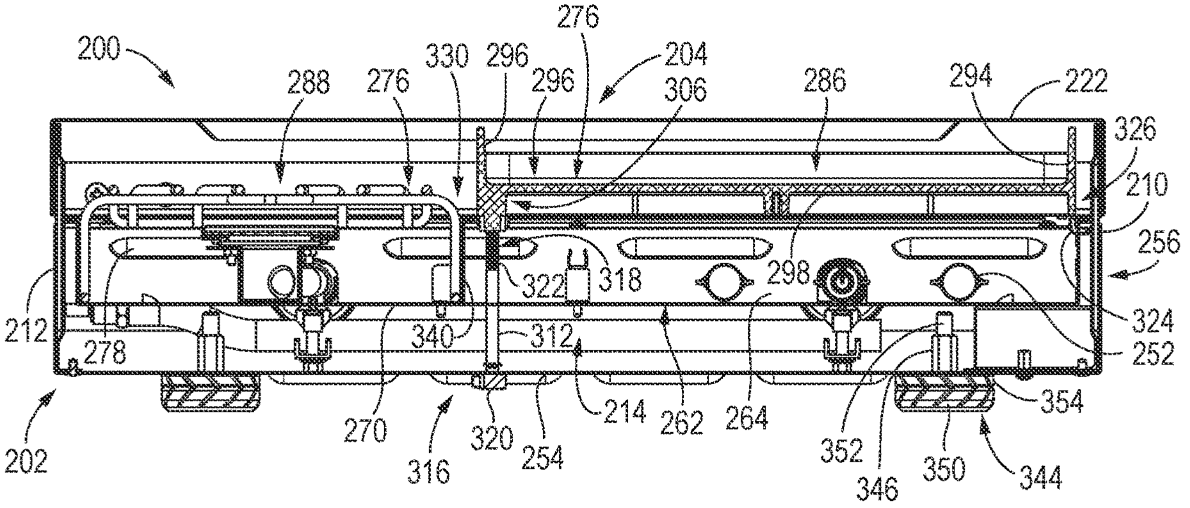
FIG. 31 is a cross sectional view of the portable cooking stove taken along section line F-F of FIG. 27, according to another embodiment of the present invention.

With reference to FIGS. 29-31, as described in previous embodiments, the interior 214 may include burners 252 positioned therein. The burners 252 may be operably coupled to the burner knobs 216 positioned on the front panel 206. Also, the cooking stove 200 may include a lower panel 254 that may extend to the front panel 206, rear panel 208, left panel 210, and right panel 212. Further, the lower panel 254 may be coupled to the front panel 206, rear panel 208, left panel 210, and right panel 212. The lower panel 254 may extend at least partially parallel to the upper panel 222 of the lid 204 upon the lid 204 being in the closed position. The lower panel 254 may enclose the interior 214 of the main body 202 from an exterior 256 of the main body 202, such that, the only access to the interior 214 of the main body 202 may be when the lid 204 is in the open position. Further, the lower panel 254 may include lower vents 258 defined therein, or elongated holes, sized and configured to draw air from the exterior 256 of the main body 202 to the interior 214 of the main body 202. The lower vents 258 may be positioned throughout the lower panel 254, in another embodiment, the lower vents 258 may be positioned directly below the burners 252 such that the lower vents 258 may provide air to the burners 252. Further, the cooking stove 200 may include an inner tray 262 that may define burner bents 272 therein, the burner vents 272 being positioned directly under or adjacent the burners 252. The rear panel 208 of the main body 202 may include rear vents 260 extending along the length of the rear panel 208. The rear vents 260 positioned lower than the level of the inner tray 262 may be sized and configured to provide air flow to the interior 214 of the main body 202 to provide oxygen to the burners 252 and the rear vents 260 positioned above the level of the inner tray 260 may facilitate circulating air flow from or out from the interior 214 of the main body 202. In this manner, air or oxygen may be drawn into the interior 214 of the main body 202 through the lower vents 258 and air may be directed out of the interior 214 of the main body 202 through the rear vents 260 or air may be directed into the interior through the rear vents 260.

The interior 214 of the cooking stove 200 may also include the inner tray 262 extending to define a front side 264, left side 266, and right side 268. The front side 264, left side 266, and right side 268 of the inner tray 262 may extend at least partially parallel to or along the front panel 206, left panel 210, and right panel 212 of the main body 202, respectively. The inner tray 262 may include a floor panel 270 extending to the front side 264, left side 266, and right side 268 of the inner tray 262. Also, the floor panel 270 may extend to the rear panel 208 of the main body 202. In this configuration, the floor panel 270 may be positioned directly below the burners 252 such that the burners 252 may be positioned within the inner tray 262. Further, the floor panel 270 may be positioned below and above the rear vents 260. The floor panel 270 may include burner vents 272 defined therein, the burner vents 272 positioned directly below the burners 252. In another embodiment, the burner vents 272 may be positioned near or around the burners 252. The burner vents 272 may be sized and configured to draw and direct air or oxygen to the burners 252. The lower vents 258, burner vents 272, and rear vents 260 may collectively make up the ventilation system 274 or venting system. The ventilation system 274 may work similarly to what has been described in the previous embodiments provided herein. As such, in some embodiments, air may enter the interior 214 of the main body 202 through the lower vents 258, the burner vents 272 may then direct the air towards the burners 252 for burning fuel so that heated air flow may move upward towards a cooking surface 276 and, along some portions of the cooking stove 200. The heated air may then be ventilated out of the interior 214 of the main body 202 by way of the rear vents 260. In some embodiments, the ventilation system 274 may also include front vents 278 positioned on the front side 264 of the inner tray 262. The front vents 278 may be configured to provide air flow between the front side 264 of the inner tray 262 and the front panel 206 of the main body 202. Similar to previous embodiments, the ventilation system 274 may circulate air through the cooking stove 200 to provide oxygen to the burners 252 and minimize a temperature of various components of the cooking stove 200 as well as the exterior surface of the main body 202.

Figure 32:
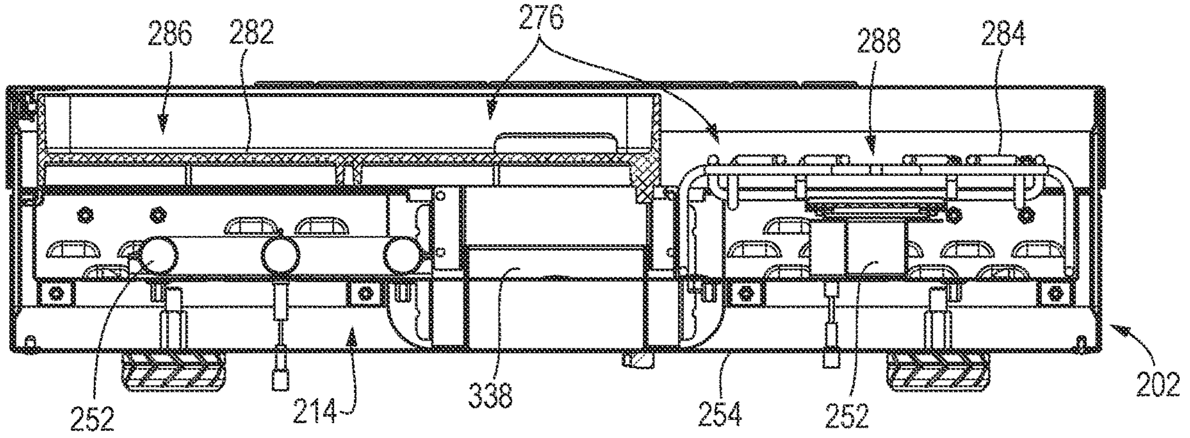
FIG. 32 is a cross sectional view of the portable cooking stove taken along section line G-G of FIG. 27, according to another embodiment of the present invention.

With reference to FIGS. 28, 29, and 32, the cooking surface 276 of the cooking stove 200 may extend generally parallel to the lower panel 254 of the main body 202 and over the interior 214, such that, the cooking surface 276 may be positioned above the burners 252. The cooking surface 276 may include a griddle surface 282 and/or a grate surface 284. The griddle surface 282 may extend as a portion of a griddle 286, the griddle 286 extending partially over the interior 214 of the cooking stove 200. The grate surface 284 may extend as a range grate 288 and may also extend partially over the interior 214 of the cooking stove 200. In one embodiment, the griddle 286 and range grate 288 may both extend over the interior 214 of the main body 202, providing first and second cooking surfaces, which may collectively be referenced as the cooking surface 276.

Figure 33:
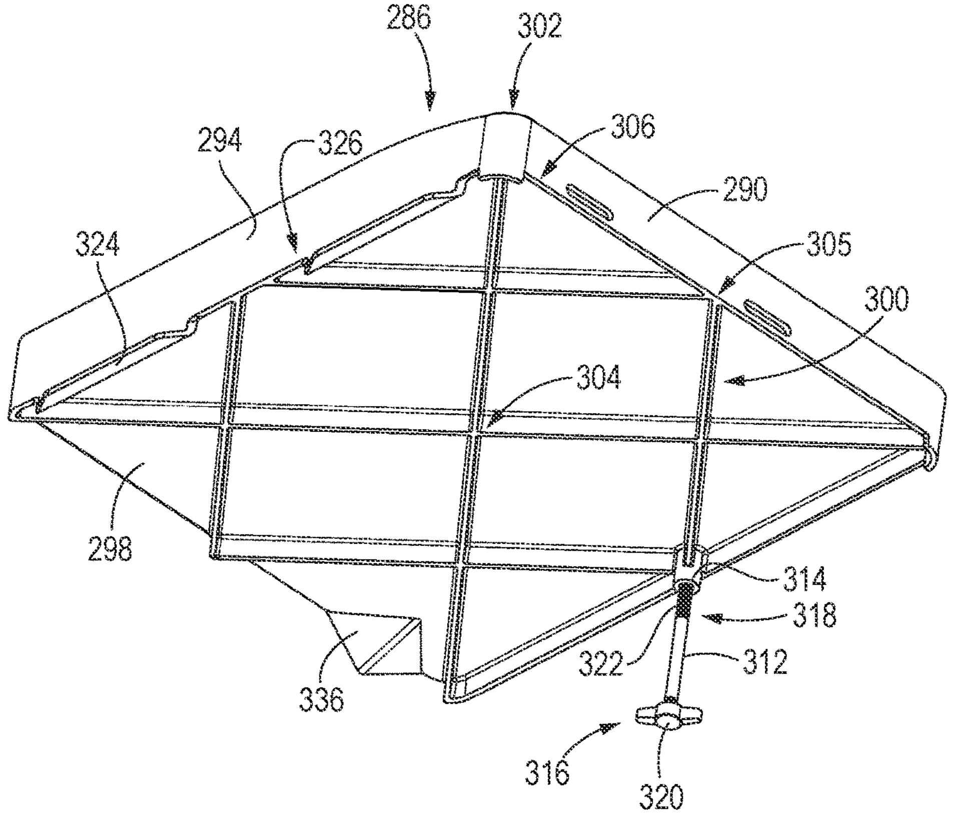
FIG. 33 is a bottom perspective view of a griddle, according to another embodiment of the present invention.
Figure 34:
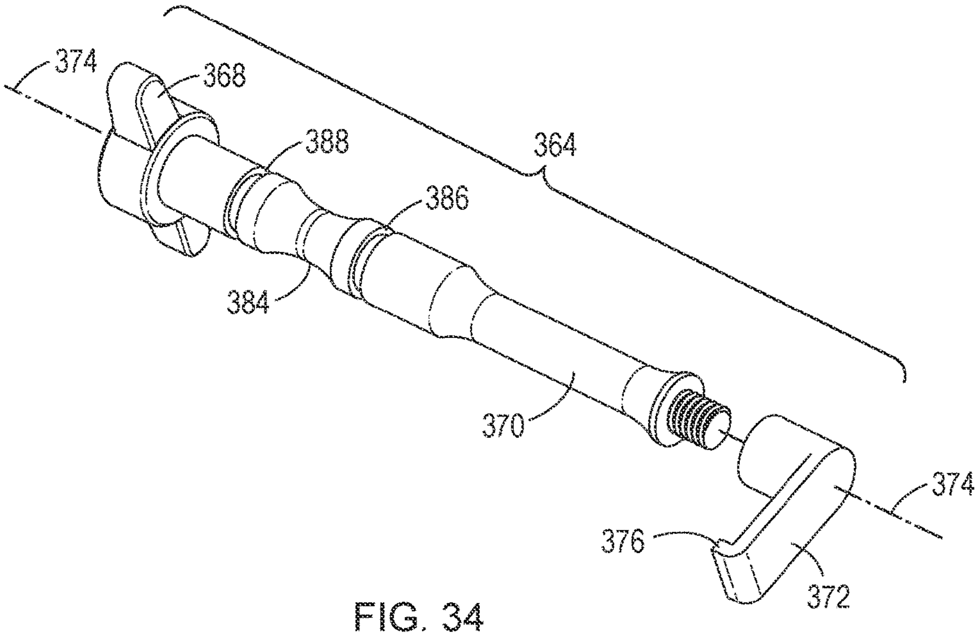
FIG. 34 is an exploded view of an elongated structure, according to another embodiment of the present invention.
Figure 35:
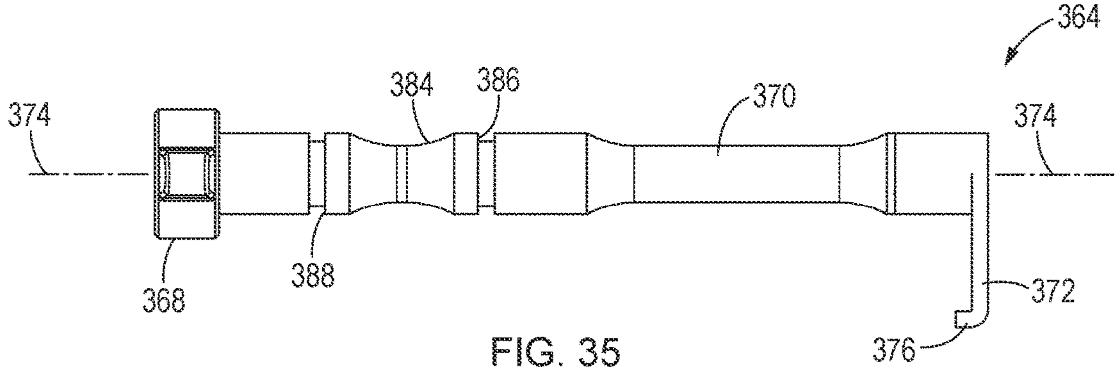
FIG. 35 is a side view of the elongated structure, depicting a handle and an arm, according to another embodiment of the present invention.

With reference to FIGS. 28 and 33, similar to previous embodiments, the griddle 286 may include the griddle surface 282. The griddle surface 282 may extend to a splash guard surrounding the griddle surface 282, such as a front guard 290, a rear guard 292, a left guard 294, and a right guard 296. The front guard 290, rear guard 292, left guard 294, and right guard 296 may be sized configured to be a barrier from splatter of food debris and grease. Further, the front guard 290, rear guard 292, left guard 294, and right guard 296 may extend generally parallel to the front panel 206, rear panel 208, left panel 210, and right panel 212, respectively. As described above, in this embodiment, the griddle 286 may extend partially over the interior 214 of the main body 202, rather than completely over the interior 214 of the main body 202. In this configuration, the griddle 286 may extend over at least one burner 252. The griddle 286 may also include an underside surface 298 extending to include ribs 300 defined thereon. The ribs 300 may be sized and configured to provide stability to the griddle 286 to assist in resisting thermal stress and tension placed upon the griddle 286 from the high heat provided by the burners 252 while also placing frozen food items on the cooking surface of the griddle 286. Further, the ribs 300 may extend along the underside surface 298 with an x-configuration along with other rib configurations. For example, the ribs 300 may extend from corners 302 of the griddle 286 to a center 304 of the underside surface 298 of the griddle 286. In another embodiment, ribs 300 may be provided to extend from a middle 305 of an edge 306 of the underside surface 298 to the middle 305 of an adjacent edge 306 of the underside surface 298. The ribs 300 may extend to define multiple x-configurations and/or diamond configurations, to exhibit a crisscross pattern, or like structures. The range grate 288 may include the grated surface 284 extending over at least one of the burners 252. The grated surface 284 may provide exposure to the burner 252. In one embodiment, the range grate 288 may extend with multiple lateral rods 308 and multiple longitudinal rods 310 to define the grated surface 284. The grated surface 284 may be the type to facilitate food to be cooked over the burner 252 positioned below. In another embodiment, the grated surface 284 may be a range grate 288 sized and configured to support a pan or pot to be heated by the burner 252.

With reference to FIGS. 30, 31, and 33, the griddle 286 may be secured to the cooking stove 200 in a similar manner to the previous embodiments. The griddle 286 may include a bolt 312 and a bolt inlet 314 sized and configured to secure the griddle 286 to the main body 202 to maintain position when the cooking stove 200 may be transported. The bolt inlet 314 may be positioned and coupled along the edge 306 of the underside surface 298 of the griddle 286 near the left or right guards 294, 296. The bolt 312 may be removably coupled to the bolt inlet 314 by threading the bolt 312 into and out of the bolt inlet 314. The bolt 312 may extend from the exterior 256 of the main body 202 on the lower panel 254 to the bolt inlet 314 such that the griddle 286 may be coupled to the main body 202 by means of the removable coupling of the bolt 312. The bolt 312 may extend to define a first end 316 and a second end 318. The first end 316 may include a head 320 and the second end 318 or end portion may define threads 322. The head 320 may be positioned on the exterior 256 of the main body 202 such that the head 320 may be flush or adjacent to the lower panel 254 and the bolt 312 may extend from the head 320 to the bolt inlet 314. Further, the threads 322 defined on the second end 318 of the bolt 312 may be sized and configured to thread into the bolt inlet 314. In this manner, the griddle 286 may be removable from the main body 202. The griddle 286 may also include tabs 324. The tabs 324 may be an extension of the front, rear, left, and/or right guards 290, 292, 294, 296 and may extend perpendicular therefrom. Further, the tabs 324 may extend from a lower periphery 326 of either the front, rear, left, or right guards 290, 292, 294, 296. Similar to previous embodiments, the tabs 324 may define at least two distinct tabs 324 positioned on the same side of either the front, rear, left, or right guards 290, 292, 294, 296 and be sized and configured to insert into tab inlets 328 (FIG. 29) defined in the inner tray 262 so as to be positioned along the corresponding front, rear, left, or right panels 206, 208, 210, 212 of the main body 202. As such, in one embodiment, the inner tray 262 may extend to include the tab inlets 328 defined therein such that the tabs 324 may be positioned through the tab inlets 328. The tabs 324 may be positioned on the opposite side of the griddle 286 than that of the bolt 312 such that the griddle 286 may be secured to the main body 202 along opposing sides of the griddle 286. Further, the main body 202 being a dual cooking surface 276 may include the bolt 312 being positioned near a surface periphery 330 of the griddle 286. The surface periphery 330 may be defined by the side of the griddle 286 positioned adjacent the range grate 288. The inner tray 262 may also include a divider wall 340 (FIG. 29) extending along the surface periphery such that the divider wall 340 may separate the region for the griddle 286 from the region for the range grate 288. Further, the divider wall 340 may be configured to act as a heat shield relative to the region of the griddle 286 and the region of the range grate 288.

With reference to FIGS. 29 and 30, the range grate 288 may be secured within the interior 214 of the main body 202 by means of a rim 332. The range grate 288 may bend downward and then outward to define the rim 332. As such, the rim 332 of the range grate 288 may be sized and configured to extend below a portion of the main body 202, such as a framed edge 334 along an inner side of the main body 202. The rim 332 may be sized and configured to lock or be positioned below the framed edge 334 to minimize movement of the range grate 288 relative to the main body 202 of the cooking stove 200. In this manner, the rim 332 may be positioned below the framed edge 334 and the range grate 288 so as to removably secure the range grate 288 within the interior 214 of the main body 202.

Now with reference to FIGS. 28, 32, and 33, the griddle surface 282 of the griddle 286 may extend to define a grease drain portion 336 positioned adjacent the rear guard 292 and adjacent a corner 302 of the griddle 286. The grease drain portion 336 may be sized and configured to drain excess grease or food debris from the griddle 286 and into a grease cup 338 (FIG. 29) positioned below the grease drain portion 336. The grease cup 338 (FIG. 29) may include similar features as described in previous embodiments such that the grease cup 338 may be positioned and secured within the interior 214 of the main body 202, upon the cooking stove 200 being in a compact position. Further, the grease cup 338 may be positioned directly below the grease drain portion 336, upon the cooking stove being placed in the use position, similar to that described in previous embodiments. The grease cup 338 (FIG. 29) may include arms 342 or rails (FIG. 29) sized and configured to facilitate sliding the grease cup 338 (FIG. 29) into the interior 214 of the main body 202 to hold or lock the grease cup 338 therein.

With reference to FIGS. 30 and 31, the cooking stove 200 may include feet 344, such as four feet, rotatably coupled to structure or a rod receiver 346 associated with the lower panel 254 of the main body 202. Such feet 344 may facilitate suspending the main body 202 of the cooking stove 200 above the floor or ground surface upon which the cooking stove 200 may be positioned to define a gap 348, the gap defined between the lower panel 254 and the ground surface. Further, each of the feet 344 may be independently adjustable to facilitate leveling the cooking stove 200 relative to the ground surface. For example, each of the feet 344 may include a base 350, a threaded rod 352 and a spacer 354. The spacer 354 may be fixed to the threaded rod 352 and the base 350 may be rotatably coupled to the threaded rod 352. The threaded rod may be threadably coupled to the rod receiver 346 associated with the lower panel 254 of the main body 202. With this arrangement, each of the feet 344 may be independently adjusted so that the cooking stove 200 may be appropriately leveled relative to the ground surface or floor that the cooking stove may be positioned upon. The feet 344 of the cooking stove 200 (as well as the feet 91 of cooking stove of FIG. 7) may be structurally and functionally similar to the feet disclosed in commonly assigned U.S. patent application Ser. No. 18/213,083, filed Jun. 22, 2023, and entitled "PORTABLE COOKING STATION WITH INDEPENDENTLY ADJUSTABLE LEG HEIGHT, SYSTEM AND METHOD THEREOF," the disclosure of which is incorporated by reference herein in its entirety.

Now with reference to FIGS. 34, 35, 36, 36A and 37, another embodiment of a cooking stove 360 with an elongated structure 364 or bolt like structure for capturing and releasing a griddle 366 to a main body 362 of the cooking stove 360 is provided. In this embodiment, the elongated structure 364 may be spring biased or spring loaded and may be moved between a locked position (or engaged position) and an unlocked position (or disengaged position) by rotating the elongated structure 364, such as a quarter rotation or turn. As such, the elongated structure 364 may be manually rotated to engage or disengage the elongated structure 364 from the griddle 366 with minimal rotation and, thus, minimizing the time and effort to disassemble the griddle 366 from the main body 362.

For example, the elongated structure 364 may include a handle 368, an elongated body 370 and an arm 372, the elongated body 370 defining an axis 374 defined along a longitudinal length of the elongated body 370. The elongated body 370 may extend most or all of the length of the elongated structure 364 and may extend between opposing ends. At one end, the elongated body 370 may exhibit the handle 368 and, at the opposite end, the elongated body 370 may include the arm 372. The handle 368 may include oppositely extending fins that may laterally extend relative to the axis 374 and from the elongated body 370 in a wing type arrangement or "wing-nut" type structure. Such fins of the handle 368 may be sized and configured to facilitate readily grabbing the handle 368 to manually rotate the elongated structure 364 about the axis 374. The arm 372 may be an elongate extension that may extend laterally relative to the axis 374 and away from the elongated body 370. The arm 372 may extend to a free end, the free end including a lip 376 or catch at the free end of the arm 372. The arm 372 and handle 368 may be sized and configured to be fixed structures at opposing ends of the elongated body 370. In one embodiment, the elongated structure 364 may be formed as a molded structure or partially molded structure. In another embodiment, the elongated structure 364 may be formed from separate components such that the handle 368 and arm 372 may be connected to the opposing ends of the elongated body 370. Such connection may be implemented by threadably connecting the handle 368 to one end of the elongated body 370 and threadably coupling the arm 372 to the other end of the elongated body 370.

The elongated body 370 may include structure sized and configured to support a spring 378, as previously set forth, as well as a first clip 380 and a second clip 382. The spring 378 may be positioned around a narrow portion 384 of the elongated body 370. The first clip 380 may be positioned in a first indent 386 defined in the elongated body 370 and the second clip 382 may be positioned in a second indent 388 defined in the elongated body 370. The first and second indents 386, 388 may be sized and configured to hold the first and second clips 380, 382, respectively. The first and second clips 380, 382 may extend as a ring like structure or a partial ring structure or extend similar to an "e" clip or "c" clip.

Similar to previous embodiments, the cooking stove 360 may include the griddle 366, a lower panel 390 and an inner panel 392 each of which may include an opening for positioning the elongated structure 364 therein. Although not shown, the griddle 366 of this embodiment may include tabs that may be inserted through insert openings of the inner panel 392 or main body 362, similar to that described in previous embodiments (see e.g., tabs 30 and tab inlets 146 in FIG. 22A). In this embodiment, the griddle 366 may include a griddle opening 394 defined therein, the griddle opening 394 sized and configured to receive the arm 372 of the elongated structure 364. Further, the griddle opening 394 may be sized so that the elongated structure 364 may rotate about the axis 374 of the elongated structure 364 and so that the arm 372 may move between an arm inserted position and an arm withdrawn position, relative to the griddle opening 394. In one embodiment, the griddle opening 394 may be defined within a rib 396 extending downward from an underside surface 398 of the griddle 366. In another embodiment, instead of in the rib 396, the arm may engage another type of griddle opening defined in a structure associated with the griddle 366. The lower panel 392 may include a lower panel opening 402 defined therein, the lower panel opening 402 sized and configured to facilitate the elongated body 370 of the elongated structure 364 to be positioned therein. The inner panel 392 may be a part or portion of an inner tray, similar to that described in previous embodiments. The inner panel 392 may also include an inner panel opening 404 defined therein, the inner panel opening 404 sized and configured to facilitate the elongated body 370 of the elongated structure 364 to be positioned therein. With this arrangement, the elongated structure 364 may be positioned through the lower panel opening 402 and the inner panel opening 404 with the handle 368 positioned adjacent the exterior side of the lower panel 390 and the spring 378 positioned around the narrow portion 384 of the elongated body 370 so as to be positioned between the lower and inner panels 390, 392. The first clip 380 may facilitate holding the spring 378 to the elongated body 370 of the elongated structure 364. The second clip 382 may act as a back-stop against the lower panel 390, upon the elongated structure 364 being moved to the disengaged position.

As previously set forth, the elongated structure 364 may be spring biased and may be manually rotated about the axis 374 to move the elongated structure 364 between an engaged position and a disengaged position. In the engaged position, the elongated structure 364 may be manually moved upward so as to partially compress the spring 378 and manually rotate the elongated structure 364 with the handle 368 so that the arm 372 may be positioned within the griddle opening 394. Further, in the engaged position, the spring 378 may be in a biased and at least partially compressed position so that the arm 372 may press against a surface of the griddle 366 to hold the arm 372 within the griddle opening 394. Further, the lip 376 of the arm 372 may extend over structure defining the griddle opening 394 so as to catch and hold the arm 372 of the elongated structure 364 in the engaged position. In this manner, the spring 378 biases the elongated structure 364 to be maintained in the engaged position to, thus, maintain the griddle 366 in the locked position with the main body 362 of the cooking stove 360.

To move the elongated structure 364 to the disengaged position, the handle 368 may be manually pressed upward to further compress the spring 378 so that the lip 376 of the arm 372 may freely clear the structure of the griddle opening 394. The handle 368 may then be rotated about the axis 374, as shown by rotational arrow 406, so that the arm 372 may be moveable out of the griddle opening 394. The handle 368 may then be moved linearly downward by the user releasing the handle 368 or simply allowing the spring 378 to decompress to move the arm 372 and elongated structure 368 downward and away from the griddle opening 394 until the second clip 382 of the elongated structure 368 moves to be biased against a surface of the lower panel 390, as shown by linear arrow 408. Upon the elongated structure 364 being moved to the disengaged position, the griddle 366 may then readily be removed from the main body 362 (by disengaging the tabs of the griddle 366 from the main body 362, as described in previous embodiments). Upon disengaging the griddle 366 relative to the main body 362, the user may then reassemble the griddle 366 to the main body 362 of the cooking stove 360, as desired. Similar to that described above and for additional clarity, the griddle 366 may be moved to the locked position by simply re-engaging the tabs of the griddle 366 with the main body 362, after which, the handle 368 of the elongated structure 364 may be manually moved upward to compress the spring 378, and then the handle 368 may simply be manually rotated, such as about a quarter turn, so that the arm 372 moves into the griddle opening 394. The user may then release the handle 368 so that the spring 378 biases the arm 372 against a surface of the griddle 366 with the lip 376 overhanging structure defining the griddle opening 394, as previously set forth, thereby, placing the elongated structure 364 in a spring biased engaged position to lock the griddle 366 to the main body 362. With this arrangement, the elongated structure 364 may readily be moved between engaged and disengaged positions to secure and unsecure the griddle 366 to the main body 362 of the cooking stove 360.

The various structural components of the various embodiments of the portable cooking stove set forth herein may be formed from metallic materials, such as stainless steel, aluminum, copper, or any other suitable metallic material, or some components may be formed from one or more polymeric materials, such as the fuel lines, as well as any other materials needed to form and manufacture the various components of the cooking stove, as known by one of ordinary skill in the art. Further, the structural components of the cooking stove may be formed by employing known manufacturing techniques and processes, such as welding, molding, milling, drilling, bending, fastening, soldering, etc., as known to one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A portable cooking stove configured to be compactable, the cooking stove comprising:

a main body extending with one or more panels and a lid hingeably coupled to the main body, the main body including burners positioned therein;

a griddle sized and configured to be positioned over the burners and supported by the main body, the griddle including at least one tab extending from the griddle and a griddle opening defined in an underside of the griddle; and an elongated structure defining an axis extending along a longitudinal length of the elongated structure, the elongated structure including a handle at one end of the elongated structure, the elongated structure configured to be positioned through the one or more panels of the main body with the handle exposed along an exterior side of the main body and with the elongated structure configured to engage with the griddle opening defined in the underside of the griddle;

wherein the griddle is configured to be removably secured to the main body with the at least one tab of the griddle sized to engage structure associated with the one or more panels of the main body and with the elongated structure removably secured to the griddle opening defined in the underside of the griddle.

2. The portable cooking stove of claim 1, wherein the handle is configured to be rotated about the axis of the elongated structure to threadably secure the elongated structure to the griddle.

3. The portable cooking stove of claim 1, wherein the elongated structure comprises a spring and an arm, the spring configured to bias the elongated structure toward the griddle such that, upon the handle being rotated in one direction, the arm is engageable with structure defining the griddle opening and, upon the handle being rotated in another direction, the arm is disengageable with the structure defining the griddle opening.

4. The portable cooking stove of claim 1, wherein the one or more panels of the main body comprise at least one tab inlet defined therein, the tab inlet sized and configured to receive the at least one tab of the griddle for securing the griddle to the main body.

5. The portable cooking stove of claim 1, wherein the lid comprises one or more latches, the lid configured to be moved between an open position and a closed position, wherein, upon the lid being in the closed position, the lid is latchable to the main body to maintain the lid in the closed position.

6. The portable cooking stove of claim 1, wherein the underside of the griddle comprises ribs extending therefrom, the ribs positioned to exhibit an x-configuration to reinforce the griddle from thermal stresses.

7. The portable cooking stove of claim 1, further comprising a range grate, the range grate positioned along one side of the griddle and securable to the main body.

8. The portable cooking stove of claim 1, further comprising a grease cup with at least one rail, the grease cup moveable between a use position and a stow position, the use position configured to be positioned below a rear opening defined in the griddle, and the stow position configured to be positioned within a slot defined along a rear side of the main body.

9. The portable cooking stove of claim 1, wherein the one or more panels comprises a lower panel and an inner panel, the inner panel acting as a heat shield to an exterior surface of the main body.

10. The portable cooking stove of claim 1, wherein the one or more panels of the main body extend to define a front side of the main body, the front side including a burner knob, a latch and a handle, the burner knob positioned between the handle and the latch, the burner knob extending from the front side to define a knob depth, the handle and the latch extending from the front side of the main body at a greater depth than the knob depth.

11. A method for securing a griddle to a portable cooking stove, the method comprising:

providing a main body with one or more panels and a lid hingeably coupled to the main body, the main body including burners positioned therein;

positioning at least one tab extending from a griddle to engage structure associated with the one or more panels of the main body such that the griddle extends over the burners;

positioning an elongated structure to extend through the one or more panels of the main body with a handle of the elongated structure exposed along an exterior side of the main body such that one end of the elongated structure is adjacent a griddle opening defined in an underside of the griddle; and rotating the handle of the elongated structure so that the one end of the elongated structure engages the griddle opening defined in the griddle to connect the one end of the elongated structure to the griddle.

12. The method according to claim 11, wherein the rotating the handle comprises threadably coupling the one end of the elongated structure to the griddle opening defined in the griddle.

13. The method according to claim 11, wherein the rotating the handle comprises engaging the griddle opening defined in the griddle with the one end of the elongated structure being spring biased against the griddle.

14. The method according to claim 11, further comprising latching the lid to the main body to removably lock the lid thereto to place the portable cooking stove in a compact configuration.

15. The method according to claim 14, further comprising moving a grease cup from a use position to a stow position such that the grease cup is maintained in a slot defined in a rear side of the main body to place the portable cooking stove in the compact configuration.

* * * * *